(12) United States Patent
Jain

(10) Patent No.: US 10,269,041 B1
(45) Date of Patent: Apr. 23, 2019

(54) METHOD, APPARATUS, SYSTEM, AND COMPUTER PROGRAM PRODUCT FOR SELECTING AN IMAGE ASSOCIATED WITH A PROMOTION

(71) Applicant: Groupon, Inc., Chicago, IL (US)

(72) Inventor: Sulabh Jain, San Jose, CA (US)

(73) Assignee: GROUPON, INC., Chicago, IL (US)

( * ) Notice: Subject to any disclaimer, the term of this patent is extended or adjusted under 35 U.S.C. 154(b) by 544 days.

(21) Appl. No.: 14/316,298

(22) Filed: Jun. 26, 2014

Related U.S. Application Data

(60) Provisional application No. 61/840,874, filed on Jun. 28, 2013.

(51) Int. Cl.
  *G06Q 30/02* (2012.01)
(52) U.S. Cl.
  CPC ..... *G06Q 30/0257* (2013.01); *G06Q 30/0255* (2013.01); *G06Q 30/0276* (2013.01)
(58) Field of Classification Search
  CPC .................................................. G06Q 30/0257
  USPC ....................................................... 705/14.55
  See application file for complete search history.

(56) References Cited

U.S. PATENT DOCUMENTS

| | | | |
|---|---|---|---|
| 2014/0195345 A1* | 7/2014 | Lyren ................. | G06Q 30/0271 705/14.53 |
| 2014/0344035 A1* | 11/2014 | Hewett .............. | G06Q 30/0211 705/14.13 |
| 2016/0007065 A1* | 1/2016 | Peles .................. | H04N 21/2668 725/14 |

* cited by examiner

*Primary Examiner* — Jamie R Kucab
(74) *Attorney, Agent, or Firm* — Alston & Bird LLP

(57) ABSTRACT

Various embodiments of the present invention are directed to methods, apparatuses, systems and computer program products that are configured to select an image associated with a promotion for presentation to a consumer. In an embodiment of the method includes associating a promotion with at least one set of images of a plurality of images, receiving at least one user selection indication, updating a user record based on the at least one user selection indication, selecting, using a processor, at least one image from the at least one set of images for presentation in association with the promotion based at least in part on the user record, and causing a transmission of the selected at least one image in association with the promotion.

22 Claims, 14 Drawing Sheets

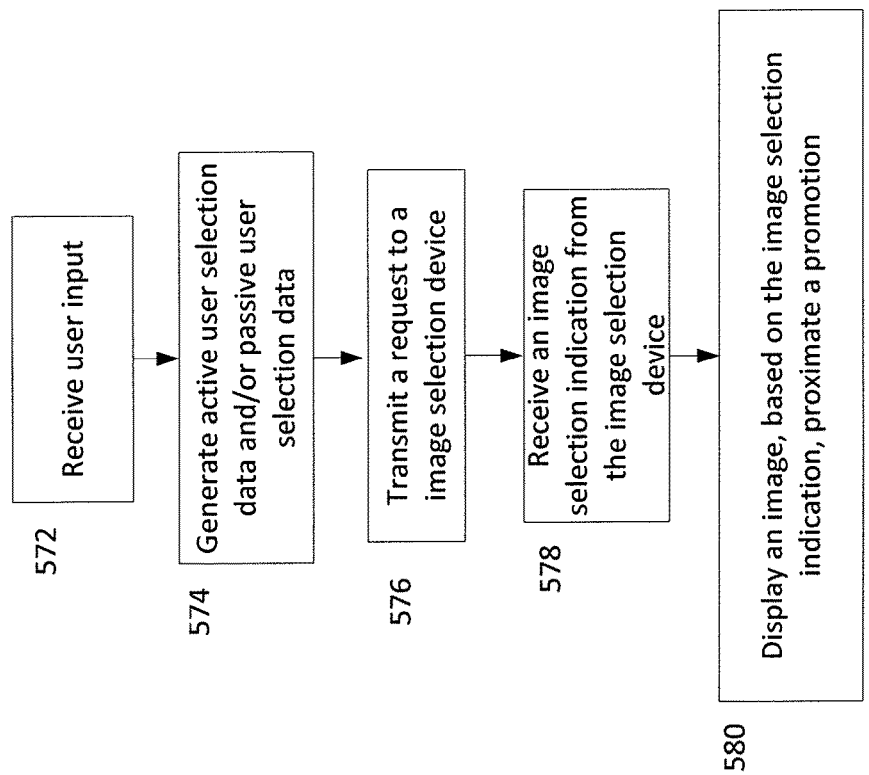

800

USER RECORD

Name: Jane Doe
Address: 100 Main Street, Springville, NC
Age: 50
Gender: Female

Profile Preferences:
Drinks wine.
Likes hair-grooming promotions.

Purchase History:
Bought promotions for
  dentist with zipcode x, community A
  nail salon with zipcode x, community B
  restaurant with zipcode y, community A
Bought gift for hair cut in zipcode z, community C.
More than 2 purchased promotions were associated with images comprising sunsets.

Redemption History:
Redeemed the dentist and restaurant promotion.
Redeemed for partial value the nail salon promotion.

Click Through History:
Clicked through vacation promotions 5/22/13.
Clicked through hair care promotions 5/21/13.

USER RECORD

Name: John Doe
Address: 100 Main Street, Springville, NC
Age: 30
Gender: Male

Profile Preferences:
Drinks beer.
Likes hair-grooming promotions.

Purchase History:
Bought promotions for
 veterinarian with zipcode x
 dog food with zipcode x
 dog toy with zipcode y.
Gave as a gift a promotion for a nail salon in zipcode z.

Redeem History:
Redeemed the dog food and dog toy promotion.
Redeemed for partial value the veterinarian promotion.

Click Through History:
Clicked through vacation promotions 5/22/13.
Clicked through dog grooming promotions 5/21/13.

1102 GROUPON

Well-groomed

○ Recommended because you like Well-Groomed deals.

1104

Up to 57% Off at Hair
Hair
3 miles from ⌂ Home
Stylists pull from XYZ and ABC products
to update coifs with trendy .
Over 350 bought
~~$40~~ $20 View Deal Best of 2012: Up to 77% Off Dental Exam
Dentist Associates Family Dentistry .
Multiple Locations
3 miles from ⌂ Home
Dentists aim to make patients ultracomfortable as
they examine, x-ray, and .
Over 300 bought
~~$282~~ $69 View Deal

METHOD, APPARATUS, SYSTEM, AND COMPUTER PROGRAM PRODUCT FOR SELECTING AN IMAGE ASSOCIATED WITH A PROMOTION

CROSS-REFERENCE TO RELATED APPLICATION

This application claims priority from and the benefit of the filing date of U.S. Provisional Patent Application No. 61/840,874 filed Jun. 28, 2013 the contents of which are incorporated by reference in its entirety herein.

TECHNOLOGICAL FIELD

Embodiments of the present invention relate generally to computer technology and, more particularly, relate to a system, method, apparatus, and computer program product for selecting an outputting an image associated with a promotion.

BACKGROUND

Retailers or merchants may provide coupons or discounts to consumers that are redeemable for goods or services. Such coupons or discounts are now accessible in some instances via computing devices.

Applicant has discovered problems with current methods for creating and holding consumer interest in connection with the marketing of goods and services via electronic communications. Through applied effort, ingenuity, and innovation, Applicant has solved many of these identified problems by developing a solution that is embodied by the present invention, which is described in detail below.

BRIEF SUMMARY OF EXAMPLE EMBODIMENTS

Methods, apparatuses, systems and computer program products are provided according to an example embodiment for selecting an image associated with a promotion and outputting an image for presenting with a promotion. In some embodiments, selecting an image may be based on a user record that may contain user selection indications and/or redemption indications. Such example embodiments may enable promotion providers to present personalized images to improve the perceived value, the aesthetic appeal, and/or the effectiveness of promotions for engaging a user to purchase goods and services.

In some embodiments, methods, apparatuses, and computer program products herein described select an image for a promotion. In an example embodiment a method is provided including associating a promotion with at least one set of images of a plurality of images; receiving at least one user selection indication, updating a user record based on the at least one user selection indication, selecting, using a processor, at least one image from the at least one set of images for presentation in association with the promotion based at least in part on the user record, and causing a transmission of the selected at least one image in association with the promotion. In an example embodiment of the method, the at least one user selection indication includes a promotion purchase indication.

In an example embodiment of the method, the at least one user selection indication includes a click-through indication. In an example embodiment of the method, the at least one user selection indication includes a hover indication. In some example embodiments of the method the at least one user selection indication includes an active selection indication. In an example embodiment of the method, the active selection indication includes profile preference indications. In some example embodiments of the method, the active selection indication includes consumer characteristics indications.

In an example embodiment, the method also includes receiving at least one redemption indication and updating the user record is further based on the at least one redemption indication. In an example embodiment of the method, the image database includes dynamic images. In some example embodiments of the method, the user selection indication includes a passive selection indication. In an example embodiment of the method, the user record includes geographic information. In some example embodiments of the method, the user record includes sub-geographic information associated with a demographic population.

In an example embodiment of the method, the transmission of the selected at least one image further includes causing the transmission of the selected at least one image as a portion of an impression. In an example embodiment of the method, causing the transmission of the selected at least one image further includes causing the transmission of the selected at least one image as a portion of an instrument.

In an example embodiment, the method also includes receiving at least one redemption indication and updating the user record is further based on the at least one redemption indication. The selecting at least one image also includes assigning weighted values to the at least one user selection indication and the at least one redemption indication, calculating a relevance score for respective images of the at least one set of images based on the weighted values, and selecting the at least one image from the at least one set of images for association with the promotion based on the relevance score.

In an example embodiment of the method, respective images of the plurality of images includes image properties, and the method also includes modifying at least one of the image properties of the selected at least one image based on of the user record. In an example embodiment of the method, the image properties include brightness, contrast, tone, color, gamma, hue, saturation, or resolution, and wherein the modifying at least one of the image properties includes modifying at least one of brightness, contrast, tone, color, gamma, hue, saturation, or resolution.

In another example embodiment, a method is provided including associating a promotion with at least one set of images of a plurality of images, receiving at least one redemption indication, updating a user record based on the at least one redemption indication, selecting, using a processor, at least one image from the at least one set of images based at least in part on the user record, and causing a transmission of the selected at least one image in association with the promotion.

In an example embodiment of the method, the redemption indication indicates that an instrument was redeemed for its promotional value. In some example embodiments of the method, the user record includes geographic information. In an example embodiment of the method, the user record includes sub-geographic information associated with a demographic population. In an example embodiment of the method, causing the transmission of the selected at least one image further includes causing the transmission of the selected at least one image as a portion of an impression. In some example embodiments of the method, causing the transmission of the selected at least one image further includes causing the transmission of the selected at least one image as a portion of an instrument.

In an example embodiment of the method, the selecting at least one image from at least one set of images also includes assigning weighted values to the at least one user selection indication and the at least one redemption indication, calculating a relevance score for respective images of the at least one set of images based on the weighted values, the at least one user selection indication, and the at least one redemption indication, and selecting at least one image from the at least one set of images for association with the promotion based on the relevance score.

In an example embodiment of the method, the respective images of the plurality of images include image properties, and the method also includes modifying at least one of the image properties of the selected at least one image based on of the user record. In some example embodiments of the method, the image properties include brightness, contrast, tone, color, gamma, hue, saturation, or resolution, and wherein the modifying at least one of the image properties include modifying at least one of brightness, contrast, tone, color, gamma, hue, saturation, or resolution.

In a further example embodiment, a method is provided including associating a promotion with at least one set of images of a plurality of images, selecting at least one image from the at least one set of images based at least in part on at least one user record of a plurality of user records, merging the selected at least one image with at least one of a plurality of image components based at least in part on the at least one user record, and causing a transmission of the merged image in association with the promotion.

In an example embodiment of the method the associating the promotion with a set of images also includes associating the promotion with a set of image components of a plurality of image components, and the at least one of the plurality of image components merged with the selected at least one image is selected from the set of image components. In an example embodiment, the method also includes receiving at least one user selection indication and updating respective user record based on the at least one user selection indication. In some embodiments, the method also includes receiving at least one redemption indication, and updating respective user record based on the at least one redemption indication.

In another embodiment, an apparatus is provided including at least one processor and at least one memory, the at least one memory storing computer code that, when executed by the processor, causes the apparatus to associate a promotion with at least one set of images of a plurality of images, receive at least one user selection indication, update a user record based on the at least one user selection indication, select at least one image of the set of images for presentation in association with the promotion based at least in part on the user record, and causing a transmission of the selected at least one image in association with the promotion.

In an example embodiment of the apparatus, the at least one user selection indication includes a promotion purchase indication. In an example embodiment of the apparatus, the at least one user selection indication includes a click-through indication. In some embodiments of the apparatus, the at least one user selection indication includes a hover indication. In an example embodiment of the apparatus, the at least one user selection indication includes an active selection indication. In some embodiments of the apparatus, the active selection indication includes profile preference indications.

In an example embodiment of the apparatus, the active selection indication includes consumer characteristics indications.

In an example embodiment, the computer code, when executed by the processor, further causes the apparatus to receive at least one redemption indication, and updating the user record is further based on the at least one redemption indication. In some example embodiments of the apparatus, the image database includes dynamic images. In an example embodiment of the apparatus, the user selection indication includes a passive selection indication. In an example embodiment of the apparatus, the user record includes geographic information. In some embodiments of the apparatus, the user record includes sub-geographic information associated with a demographic population.

In an example embodiment of the apparatus, causing the transmission of the selected at least one image further includes causing the transmission of the selected at least one image as a portion of an impression. In some embodiments of the apparatus, causing the transmission of the selected at least one image further includes causing the transmission of the selected at least one image as a portion of an instrument.

In an example embodiment, the computer code, when executed by the processor, further causes the apparatus to receive at least one redemption indication, and updating the user record is further based on the at least one redemption indication, The selecting at least one image further includes assigning weighted values to the at least one user selection indication and the at least one redemption indication, calculating a relevance score for respective images of the at least one set of images based on the weighted values, and selecting the at least one image from the set of images for association with the promotion based on the relevance score.

In an example embodiment of the apparatus, the respective images of the plurality of images include image properties, and the computer code, when executed by the processor, further causes the apparatus to modify at least one of the image properties of the selected at least one image based on of the user record. In an example embodiment of the apparatus, the image properties include brightness, contrast, tone, color, gamma, hue, saturation, or resolution, and wherein the modifying at least one of the image properties includes modifying at least one of brightness, contrast, tone, color, gamma, hue, saturation, or resolution.

In an example embodiment, an apparatus is provided including at least one processor and at least one memory, the at least one memory storing computer code that, when executed by the processor, causes the apparatus to associate a promotion with at least one set of images of a plurality of images, receive at least one redemption indication, update a user record based on the at least one redemption indication, select at least one image from the at least one set of images for association with the promotion based at least in part on the user record, and causing the transmission of the selected at least one image in association with the promotion.

In an example embodiment of the apparatus, the redemption indication indicates that an instrument was redeemed for its promotional value. In an example embodiment of the apparatus, the user record includes geographic information. In some example embodiments, the user record includes sub-geographic information associated with a demographic population. In an example embodiment of the apparatus, causing the transmission of the selected at least one image further includes causing the transmission of the selected at least one image as a portion of an impression. In some example embodiments of the apparatus, causing the transmission of the selected at least one image further includes causing the transmission of the selected at least one image as a portion of an instrument.

In an example embodiment, the computer code, when executed by the processor, further causes the apparatus to assign weighted values to the at least one user selection indication and the at least one redemption indication, calculate a relevance score for the respective images of the at least one set of images based on the weighted values, the at least one user selection indication, and the at least one redemption indication, and select at least one image from the at least one set of images for association with the promotion based on the relevance score. In some example embodiments of the apparatus, the respective images of the plurality of images includes image properties, and the computer code, when executed by the processor, further causes the apparatus to modify at least one of the image properties of the selected at least one image based on of the user record. In an example embodiment of the apparatus, the image properties include brightness, contrast, tone, color, gamma, hue, saturation, or resolution, and wherein the modifying at least one of the image properties includes modifying at least one of brightness, contrast, tone, color, gamma, hue, saturation, or resolution.

In still another embodiment, an apparatus is provided including at least one processor and at least one memory, the at least one memory storing computer code that, when executed by the processor, causes the apparatus to associate a promotion with at least one set of images of a plurality of images, select at least one image from the at least one set of images based at least in part on one of user record of a plurality of user records, merge the selected at least one image with at least one of a plurality of image components based at least in part on the at least one user record, and causing the transmission of the selected merged image in association with the promotion.

In an example embodiment of the apparatus, the associating the promotion with a set of images also includes associating the promotion with a first set of image components of a plurality of image components, and the at least one of the plurality of image components merged with the selected at least image is selected from the set of image components. In an example embodiment, the computer code, when executed by the processor, further causes the apparatus to receive at least one user selection indication and update respective user records based on the at least one user selection indication. In some embodiments of the apparatus, the computer code, when executed by the processor, further causes the apparatus to receive at least one redemption indication and update respective user records based on the at least one redemption indication.

In a still further embodiment, a computer program product is provided including at least one non-transitory computer-readable storage medium having computer-readable program code portions stored therein, the computer-readable program code portions including program code instructions configured to associate a promotion with at least one set of images of a plurality of images, receive at least one user selection indication, update a user record based on the at least one user selection indication, select at least one image of the set of images for presentation in association with the promotion based at least in part on the user record, and causing a transmission of the selected at least one image in association with the promotion.

In an example embodiment of the computer program product, the at least one user selection indication includes a promotion purchase indication. In an example embodiment of the computer program product the at least one user selection indication includes a click-through indication. In some example embodiments of the computer program product, the at least one user selection indication includes a hover indication. In an example embodiment of the computer program product, the at least one user selection indication includes an active selection indication.

In an example embodiment of the computer program product, the active selection indication includes profile preference indications. In an example embodiment of the computer program product, the active selection indication includes consumer characteristics indications. In some embodiments of the computer program product, the computer-readable program code instructions are configured to receive at least one redemption indication and updating the user record is further based on the at least one redemption indication.

In an example embodiment of the computer program product, the image database includes dynamic images. In an example embodiment of the computer program product, the user selection indication includes a passive selection indication. In some example embodiments of the computer program product, the user record includes geographic information. In an example embodiment of the computer program product, the user record includes sub-geographic information associated with a demographic population.

In an example embodiment of the computer program product, causing the transmission of the selected at least one image further includes causing the transmission of the selected at least one image as a portion of an impression. In some example embodiments of the computer program product causing the transmission of the selected at least one image further includes causing the transmission of the selected at least one image as a portion of an instrument.

In an example embodiment, the computer-readable program code instructions are configured to receive at least one redemption indication, and updating the user record is further based on the at least one redemption indication. The selecting at least one image further includes assigning weighted values to the at least one user selection indication and the at least one redemption indication, calculating a relevance score for respective images of the at least one set of images based on the weighted values, and selecting the at least one image from the set of images for association with the promotion based on the relevance score.

In an example embodiment of the computer program product, the respective images of the plurality of images include image properties, and the computer-readable program code instructions are configured to modify at least one of the image properties of the selected at least one image based on of the user record. In an example embodiment of the computer program product, the image properties include brightness, contrast, tone, color, gamma, hue, saturation, or resolution, and wherein the modifying at least one of the image properties includes modifying at least one of brightness, contrast, tone, color, gamma, hue, saturation, or resolution.

In another example embodiment, a computer program product is provided including at least one non-transitory computer-readable storage medium having computer-readable program code portions stored therein, the computer-readable program code portions comprising program code instructions configured to associate a promotion with at least one set of images of a plurality of images, receive at least one redemption indication; update a user record based on the at least one redemption indication, select at least one image from the at least one set of images for association with the promotion based at least in part on the user record, and causing the transmission of the selected at least one image in association with the promotion.

In an example embodiment of the computer program product, the redemption indication indicates that an instrument was redeemed for its promotional value. In an example embodiment of the computer program product, the user record includes geographic information. In some embodiments of the computer program product, the user record includes sub-geographic information associated with a demographic population. In an example embodiment of the computer program product, causing the transmission of the selected at least one image further includes causing the transmission of the selected at least one image as a portion of an impression. In some example embodiments of the computer program product, causing the transmission of the selected at least one image further includes causing the transmission of the selected at least one image as a portion of an instrument.

In an example embodiment, the computer-readable program code instructions are configured to assign weighted values to the at least one user selection indication and the at least one redemption indication, calculate a relevance score for the respective images of the at least one set of images based on the weighted values, the at least one user selection indication, and the at least one redemption indication, and select at least one image from the at least one set of images for association with the promotion based on the relevance score. In an example embodiment of the computer program product, the respective images of the plurality of images includes image properties, and the computer-readable program code instructions are configured to modify at least one of the image properties of the selected at least one image based on of the user record. In an example embodiment of the computer program product, the image properties include brightness, contrast, tone, color, gamma, hue, saturation, or resolution, and wherein the modifying at least one of the image properties includes modifying at least one of brightness, contrast, tone, color, gamma, hue, saturation, or resolution.

In still another example embodiment, a computer program product is provided including at least one non-transitory computer-readable storage medium having computer-readable program code portions stored therein, the computer-readable program code portions comprising program code instructions configured to associate a promotion with at least one set of images of a plurality of images, select at least one image from the at least one set of images based at least in part on one of user record of a plurality of user records, merge the selected at least one image with at least one of a plurality of image components based at least in part on the at least one user record, and causing the transmission of the selected merged image in association with the promotion.

In an example embodiment of the computer program product, the associating the promotion with a set of images also includes associating the promotion with a first set of image components of a plurality of image components, and the at least one of the plurality of image components merged with the selected at least image is selected from the set of image components. In an example embodiment, the computer-readable program code instructions, of the computer program product, are configured to receive at least one user selection indication and update respective user records based on the at least one user selection indication. In some example embodiments of the computer program product the computer-readable program code instructions are configured to receive at least one redemption indication and update respective user records based on the at least one redemption indication.

BRIEF DESCRIPTION OF THE SEVERAL VIEWS OF THE DRAWINGS

Figure 1:
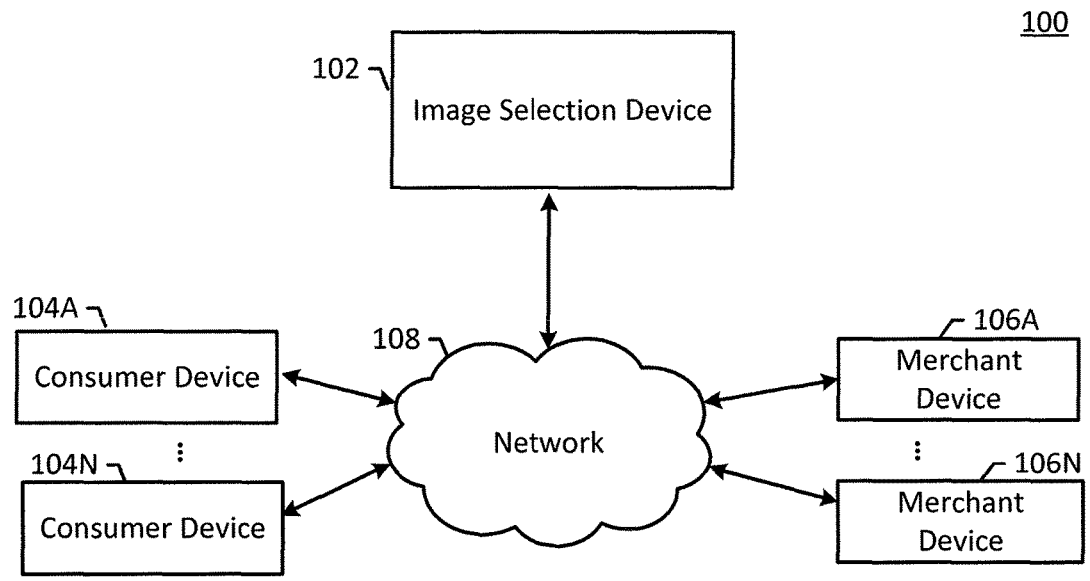
Figure 2A:
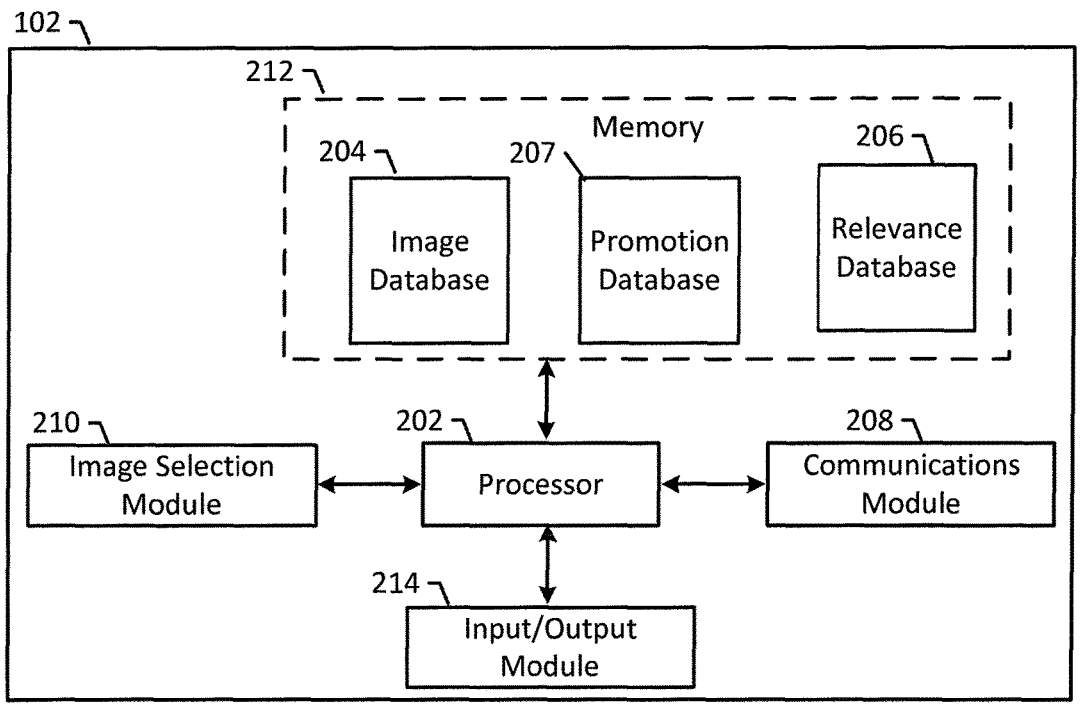
Figure 2B:
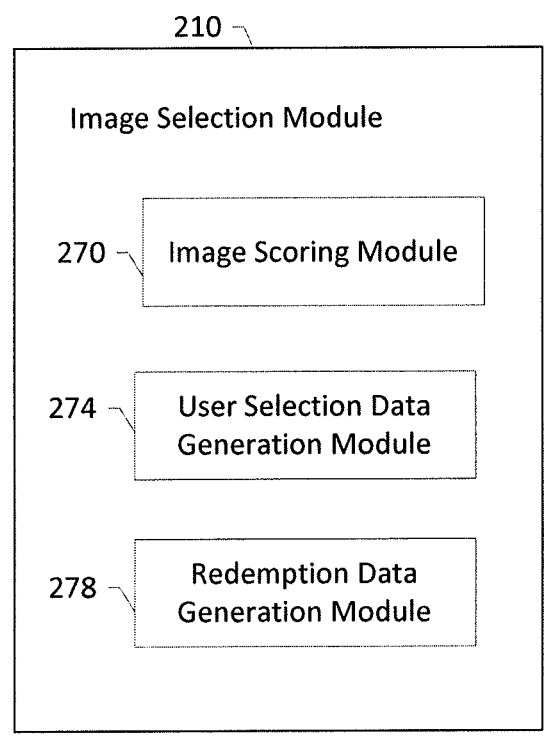
Figure 3A:
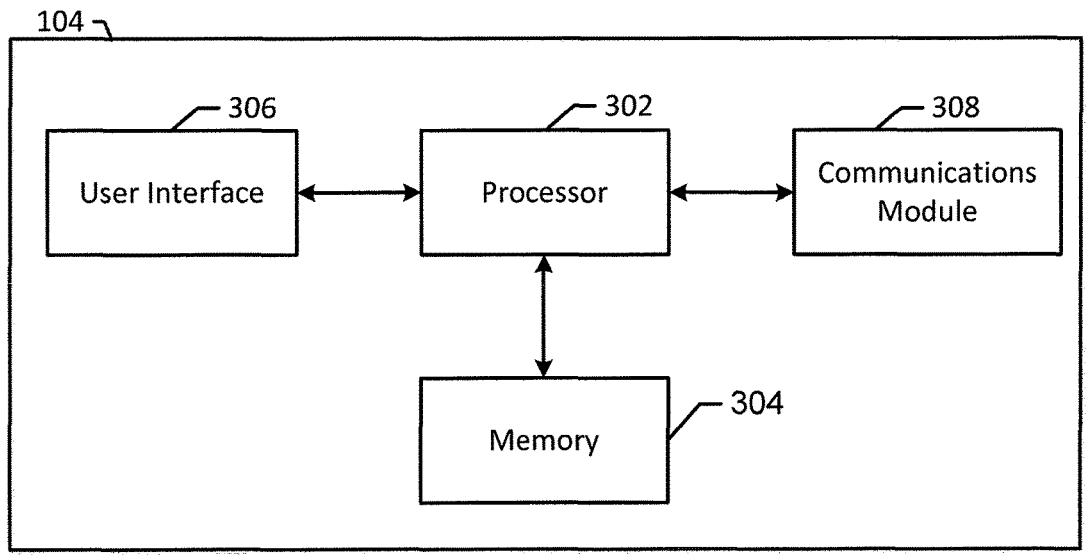
Figure 3B:
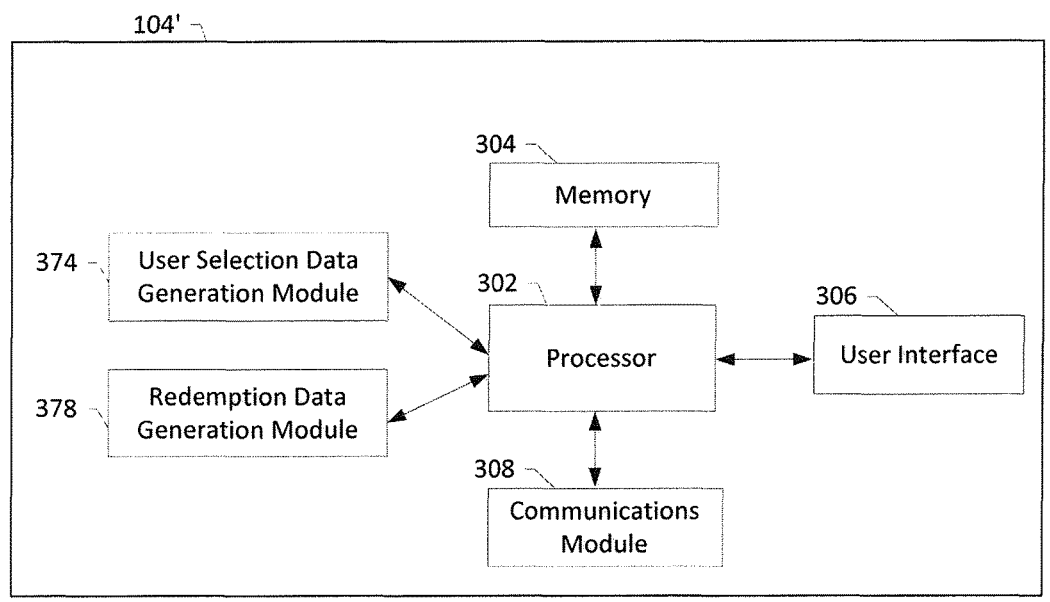
Figure 4:
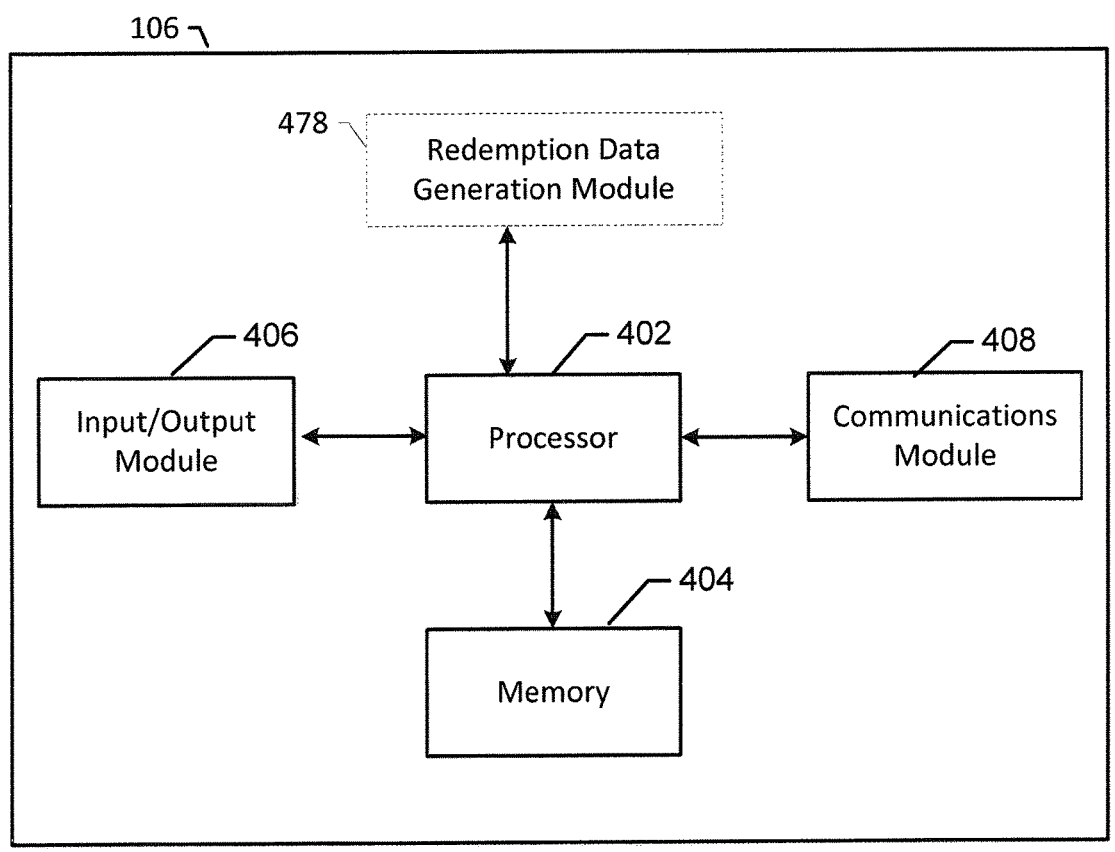
Figure 6:
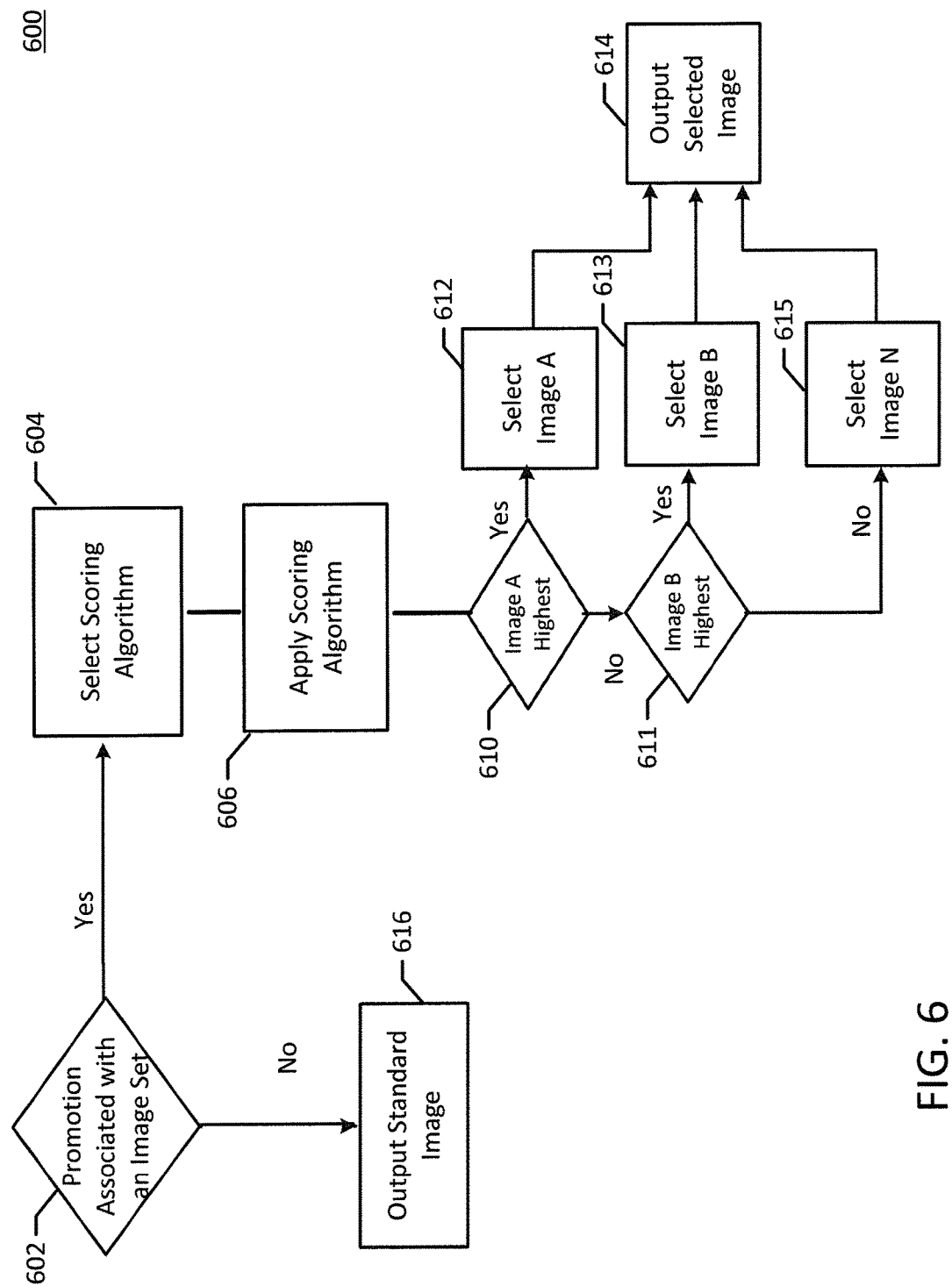
Figure 7:
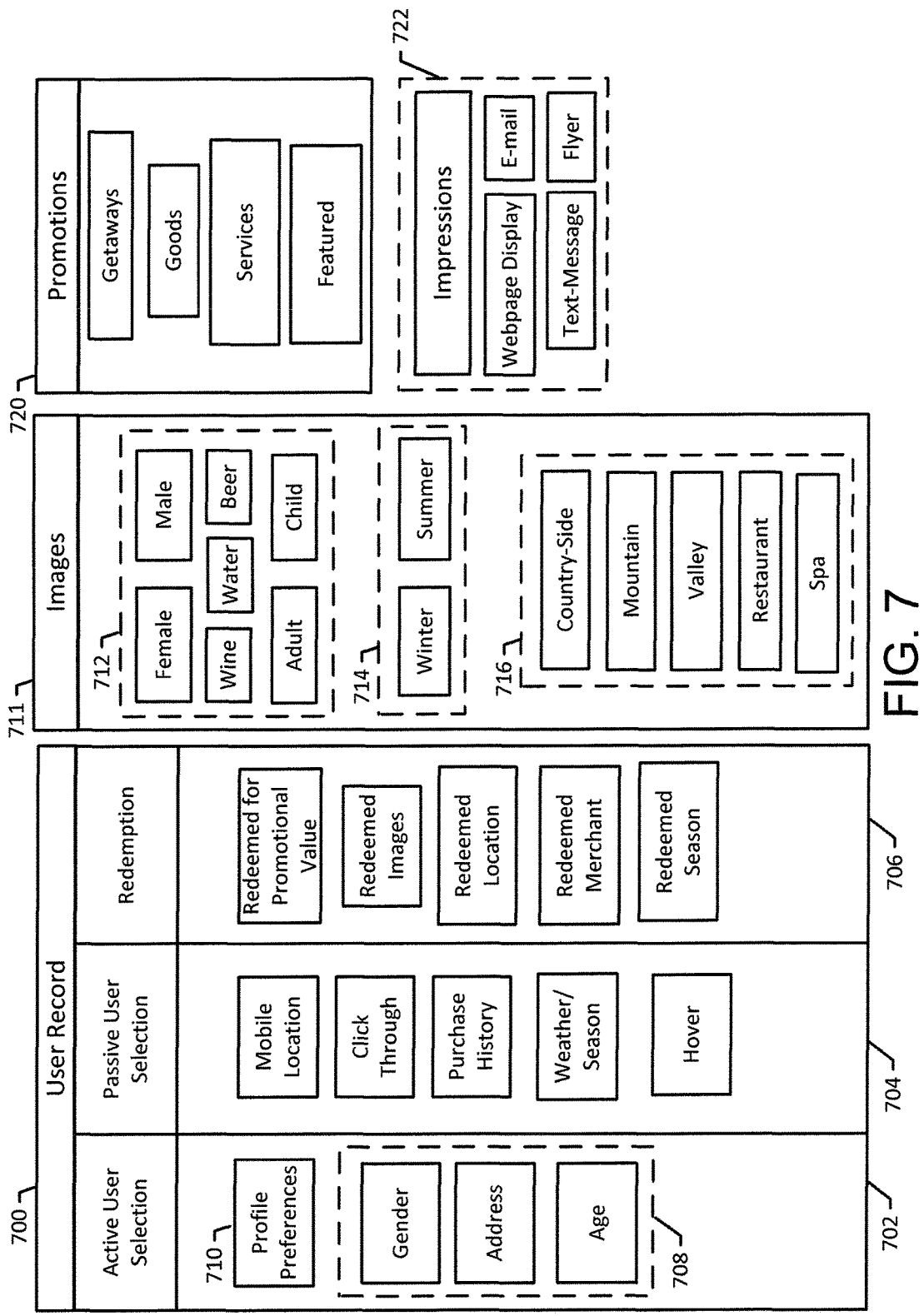
Figure 9:
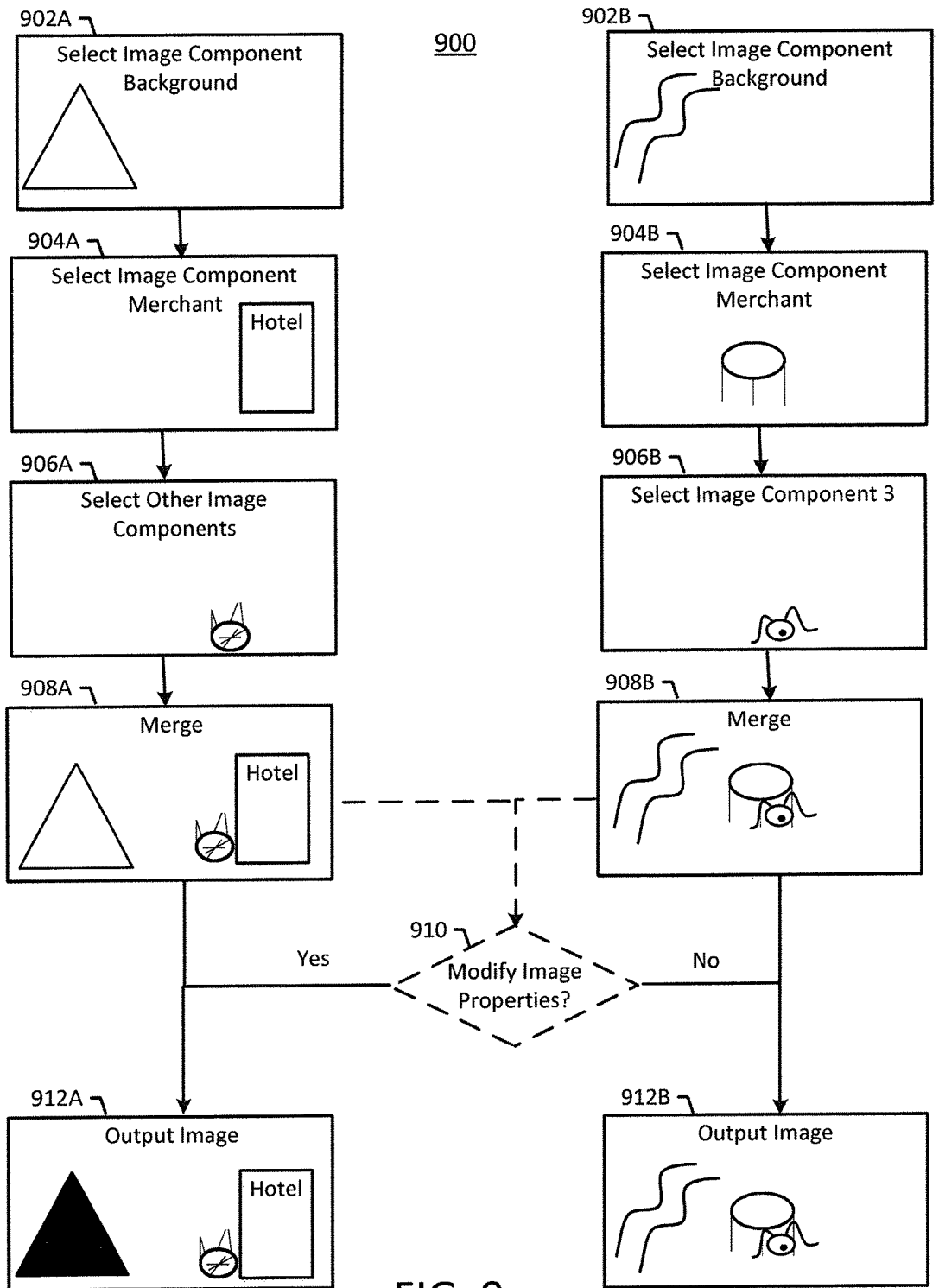
Figure 10:
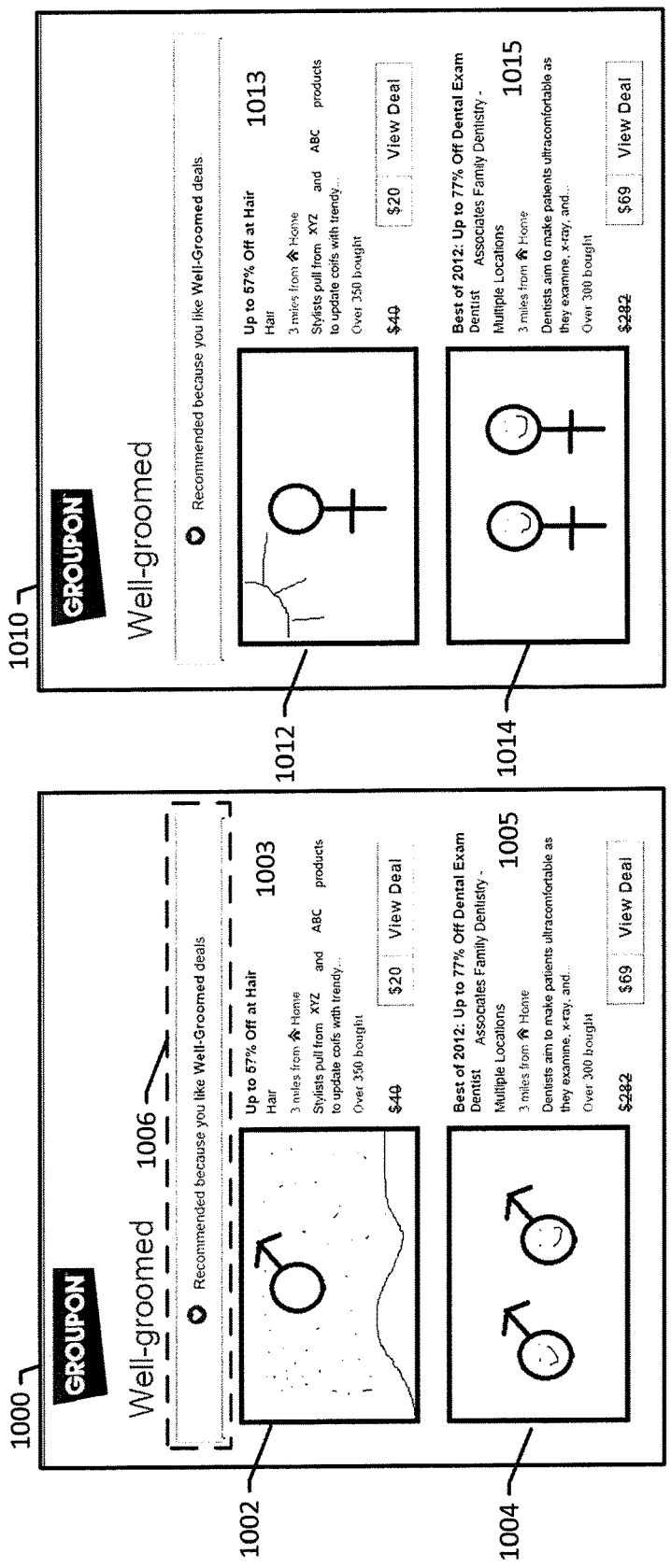

Having thus described embodiments of the invention in general terms, reference will now be made to the accompanying drawings, which are not necessarily drawn to scale, and wherein:

FIG. 1 illustrates a system for outputting an image associated with a promotion according to some example embodiments;

FIG. 2A illustrates a block diagram of an image selection device in accordance with some example embodiments;

FIG. 2B is a schematic block diagram of an image selection module circuitry that can be included in a computing device, such as an image selection device, in accordance with some example embodiments discussed herein;

FIG. 3A illustrates a block diagram of a consumer device in accordance with some example embodiments;

FIG. 3B illustrates a block diagram of a consumer device in accordance with some example embodiments;

FIG. 4 illustrates a block diagram of a merchant device in accordance with some example embodiments;

FIGS. 5A-D illustrate flow charts for outputting an image for presenting with a promotion according to some example embodiments;

FIG. 6 illustrates a flow chart for outputting an image for presenting with a promotion according to some example embodiments;

FIG. 7 illustrates example user selection indications, redemption indications, images, promotions, and impressions according to some example embodiments;

FIG. 8 illustrates example user record and selection methods according to some example embodiments;

FIG. 9 illustrates a flow chart according to an example method for outputting an image comprising image components according to some example embodiments;

FIG. 10 illustrates example impressions showing different selected images presented proximate a promotion according to example embodiments; and FIG. 11 illustrates an example impression comprising a selected image for presenting with a promotion based on a user record containing redemption and user selection indications according to example embodiments.

DETAILED DESCRIPTION

Definitions

Some embodiments of the present invention will be described more fully with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "provider parameters" may include parameters, bounds, considerations and/or the like that outline or otherwise define the term, timing, constraints, limitations, rules or the like that are indicative of how the promotion or marketing service may structure one or more promotions. Example provider parameters include, using the aforementioned running company as the example provider, limit one instrument per person, total of 100 instruments to be issued and an expiration of all instruments by May 29, 2013.

As used herein, the term "consumer" may include, but is not limited to, a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

As used herein, the term "impression" may include a communication, a display, or other perceived indication, such as a webpage, flyer, print media, e-mail, text message, application alert, mobile applications, other type of electronic interface or distribution channel and/or the like, of one or more promotions. For example, and using the aforementioned running company as the example provider, an impression may comprise a webpage or a portion of a webpage displaying a description of a promotion, which may include an instrument that is priced at $25 but redeemable for $50 toward the purchase of running shoes.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" may include the use, exchange or other presentation of an instrument for at least a portion of a good, service or experience as defined by the instrument and its related offer. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned running company as the example provider, is the exchange of the $50 instrument and $50 for the purchase of $100 running shoes.

As used herein, the term "redemption parameters" may include parameters, bounds, considerations and/or the like that outline the term, timing, constraints, limitations, rules or the like for how and/or when an instrument may be redeemed. For example, an indication that the instrument must be redeemed prior to a specified deadline, for a specific good, service or experience and/or the like. For example, using the aforementioned running company as the example provider, a limit of one instrument per visit, in store only, or an expiration of May 29, 2013.

As used herein, the term "image" refers to a visual representation, graphic, photograph, picture, figure, logo, drawing, or rendering that may be selected for display in association with a promotion. In some embodiments, as discussed in detail below, such images may be selected, configured, assembled, customized, modified, merged, or enhanced to increase the perceived appeal of the associated promotion to one or more consumers. An image may be dynamic (e.g., a video, animation, or the like) or static (e.g., photo, etc.).

As used herein, the term "image component" refers to any visual feature, indicia, component, layer, or portion that when combined with one or more other such features, indicia, components, layers, or portions form an image.

Overview

Various embodiments of the present invention are directed to methods, apparatuses, systems and computer program products that are configured to select an image associated with a promotion and for outputting the selected image for presenting to a consumer proximate the promotion. In some embodiments, the image is selected from among a plurality of images based on a user record maintained within a relevance database. In other embodiments, the user record may be maintained, at least in part, on a consumer device.

The user record may be updated based on user selection indications such as, for example, promotion purchase indications, click-through indications, hover indications, active selection indications, passive selection indications, profile preference indications, consumer characteristics indications, and the like. Alternatively or additionally, the user record may be updated based on redemption indications such as whether a purchased promotion was redeemed for all or partial value, whether a purchased promotion was gifted, and the like. User selection indications and redemption indications may indicate geographic or demographic information.

Other example embodiments may provide for "selecting or determining an image" by merging or combining one or more selected image components. Additionally, embodiments may include modifying the image properties associated with a selected image. The selection of images may include an algorithmic weighting of various indications (e.g., user selection indications, redemption indications, location indications, etc.) associated with one or more user records to produce a score for selecting the image. Said differently, the selection of images may include an algorithmic weighting of user record data derived from or generated based on such indications.

Example embodiments of the present invention provide a substantial, technical contribution to the art and, in particular, may solve a variety of technical problems including, without limitation, problems associated with attracting and holding a consumer's attention in connection with marketing promotions. Embodiments discussed herein are configured to select an image from a set of images that is best suited to engage a specific user or consumer. Through such targeted selection, such embodiments provide a form of visual persuasion that may result in higher revenues for the promotion and marketing service and the merchant, and may further result in a more efficient promotion selection process for the end user or consumer.

In some embodiments, the promotion and marketing service or merchant may present a personalized or custom image to a consumer. Moreover, example embodiments may provide further technical advantages, such as improved identification of a promotion to a consumer and improved consumer engagement concerning a promotion. Further, example embodiments may provide greater information about the promotion to the consumer simply through visual, rather that textual, communication.

The above overview is provided merely for purposes of introducing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those mentioned above.

System Architecture

FIG. 1 illustrates a system 100 for outputting a selected image associated with the promotion according to some example embodiments. While FIG. 1 illustrates one example of a configuration of a system for outputting a selected image associated with a promotion, numerous other configurations may also be used to implement embodiments of the present invention.

The system 100 may include an image selection device 102, which may be configured to provide image selection services to one or more network devices, such as consumer devices 104A-N and merchant devices 106A-N via the network 108 in accordance with one or more example embodiments disclosed herein.

The image selection device 102 may, for example, be maintained by a promotion and marketing service provider, and/or such other entity that may output images associated with a promotion and/or present images and promotions. A promotion and marketing service may provide services that are accessible via one or more computing devices. Such services may be provided in concert with or on behalf of one or more providers that are offering one or more instruments that are redeemable for goods, services, experiences and/or the like.

The promotion and marketing service may be further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

In an example embodiment, the image selection device 102 is configured to receive, via network 108, at least one user selection indication from a consumer device 104.

Alternatively, or additionally the image selection device 102 is configured to receive, via a network 108, a redemption indication from a merchant device 106. In some embodiments, based on the received redemption indication(s) and/or the user selection indication(s), the image selection device outputs an image associated with a promotion to a consumer device 104 via a network 108.

While two consumer devices (104A and 104N) are illustrated in FIG. 1, it will be appreciated that this illustration is by way of example, and not by way of limitation, as the system 100 may include additional or fewer consumer devices. A consumer device 104 may be embodied as any computing device, such as by way of non-limiting example, a cellular phone, smart phone, mobile communication device, tablet computing device, desktop computer, laptop computer, work station, mobile device, internet-connected televisions, and any combination thereof, or the like.

The consumer device 104 may be maintained and/or used by, but is not limited to, a client, consumer, purchaser, shopper, user or the like who may be in the position to or does exchange value for one or more instruments under the terms defined by the one or promotions.

In some example embodiments, the image selection device 102 and a consumer device 104 may be configured to communicate with each other over the network 108 to facilitate provision by the image selection device 102 of selected image(s) associated with promotion(s) to the consumer device 104 in accordance with one or more example embodiments. In some example embodiments, a consumer device 104 is configured to send or produce, but is not limited to sending or producing, a user selection indication to the image selection device 102.

In some example embodiments, a consumer device 104 is configured to receive or produce, but is not limited to receiving or producing, an image, a promotion, an impression and/or an instrument. In some example embodiments, an image selection device may be configured to send an image, promotion, impression and/or an instrument to a consumer device 104.

While two merchant devices (106A and 106N) are illustrated in FIG. 1, it will be appreciated that this illustration is by way of example, and not by way of limitation, as the system 100 may include additional or fewer merchant devices. A merchant device 106 may owned or used by a provider and may be embodied as any redemption tracking device and may include a cellular phone, smart phone, mobile communication device, tablet computing device, desktop computer, laptop computer, work station, mobile device, barcode scanner, point-of-sale terminal, cash register, and any combination thereof, or the like.

In some example embodiments, the image selection device 102 and the merchant device 106 may be configured to communicate with each other over the network 108 to facilitate provision by the image selection device 102 of selected image(s) associated with promotion(s) to the consumer device 104 in accordance with one or more example embodiments.

In some example embodiments, a merchant device 106 is configured to send or produce, but is not limited to sending or producing, a redemption indication to the image selection device 102. Such redemptions indications may be sent or produced following a provider's receipt and processing of an instrument. For example, in one embodiment, in instrument may include a bar code that is simply scanned by the merchant device prior to issuing its redemption indication.

The depicted image selection device 102, consumer devices 104, and merchant devices 106 may be configured to connect to the network 108 via a variety of wireless and/or wireline connections. For example, a consumer device 104 may be configured to access the network 108 via a cellular connection, wireless local area network connection, wireless wide area connection, Ethernet connection, and/or the like. As such, the network 108 may comprise a wireline network, wireless network (e.g., a cellular network, wireless local area network, wireless wide area network, some combination thereof, or the like), or a combination thereof, and in some example embodiments, includes at least a portion of the Internet. In some example embodiments, a consumer device 104 may be configured to access a website and/or other portal that may be delivered remotely by the image selection device 102.

FIG. 2A illustrates a block diagram of an image selection device 102 in accordance with some example embodiments. However, it should be noted that the components, devices or elements illustrated in and described with respect to FIG. 2A below may not be mandatory and thus some may be omitted in certain embodiments. Additionally, some embodiments may include further or different components, devices or elements beyond those illustrated in and described with respect to FIG. 2A.

The image selection device 102 may include processing circuitry that is configurable to perform actions in accordance with one or more example embodiments disclosed herein. In some example embodiments, the processing circuitry may include a processor 202 and, in some embodiments, such as that illustrated in FIG. 2A, may further include memory 212. The processing circuitry may be in communication with or otherwise control a communication module 208 and/or an image selection module 210. The processing circuitry may be configured to perform and/or control performance of one or more functionalities of the image selection device 102 in accordance with various example embodiments, and thus may provide means for performing functionalities of the image selection device 102 in accordance with various example embodiments.

The memory 212 may include an image database 204 for storing images associated with a promotion, and a relevance database 206 for storing a user record that may comprise user selection indication(s), redemption indication(s), and/or data derived from or based on the same. Additionally, the memory 212 may include a promotion database 207 for storing promotions or components of promotions; an instrument database (not shown) for storing all or part of an instrument; or an impression database (not shown) for storing all or part of an impression. While the above are described and/or depicted as separate databases, it will be appreciated that these databases could be one database.

While not shown, one of skill in the art will readily appreciate that various databases described herein (e.g., image database, relevance database, promotion database, etc.) may not by physically located on any device depicted in FIG. 1 (e.g., image selection device, consumer device, merchant device). Instead, such databases may accessible through network 108 via one or more remove servers.

Returning to FIG. 2A, the processor 202 of the image selection device 102 may be in communication with or otherwise control a communication module 208, an image selection module 210, and/or an input/output module 214. The processor 202 may be embodied as a circuit chip (e.g., an integrated circuit chip) configured (e.g., with hardware, software or a combination of hardware and software) to perform operations described herein.

As referred to herein, "module" includes hardware, software and/or firmware configured to perform one or more particular functions. In this regard, the means of circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 212) that is executable by a suitably configured processing device (e.g., processor 202), or some combination thereof.

Image selection module 210 may also or instead be included and configured to perform the functionality discussed herein related to the image selection device. In some embodiments, some or all of the functionality of the image selection device may be performed by processor 202. In this regard, the example processes and algorithms discussed herein can be performed by at least one processor 802 and/or image selection module 210. For example, non-transitory computer readable media can be configured to store firmware, one or more application programs, and/or other software, which include instructions and other computer-readable program code portions that can be executed to control each processor (e.g., processor 202 and/or image selection module 210) of the components of system 100 to implement various operations, including the examples shown herein. As such, a series of computer-readable program code portions are embodied in one or more computer program products and can be used, with a computing device, server, and/or other programmable apparatus, to produce machine-implemented processes.

Input/output module 214 may be in communication with processor 202 to receive an indication of an active user selection indications and/or to provide an audible, visual, mechanical, or other output to a user. Some example visual outputs that may be provided to a user by processor 202 are discussed in connection with FIG. 1. As such, input/output module 214 may include support, for example, for a keyboard, a mouse, a joystick, a display, a touch screen display, a microphone, a speaker, a RFID reader, barcode reader, biometric scanner, and/or other input/output mechanisms. In embodiments wherein processor 202 is embodied as a server or database, aspects of input/output module 202 may be reduced as compared to embodiments where processor 202 is implemented as an end-user machine or other type of device designed for complex user interactions. In some embodiments (like other components discussed herein), input/output module 214 may even be eliminated from processor 202. Alternatively, such as in embodiments wherein processor 202 is embodied as a server or database, at least some aspects of input/output module 214 may be embodied on an apparatus used by a user that is in communication with processor 202. Input/output module 214 may be in communication with the memory 212, communications module 208, and/or any other component(s), such as via a bus. Although more than one input/output module and/or other component can be included in image selection device 102, only one is shown in FIG. 2 to avoid overcomplicating the drawing (like the other components discussed herein).

FIG. 2B is a block diagram of an image selection module 210 configured in accordance with one embodiment of the invention. The depicted image selection module 210 comprises an image scoring module 270, a user selection data generation module 274, and a redemption data generation module 278.

Image scoring module 270 may provide functionality in scoring or ranking images and/or determining a selected image for a promotion. In some embodiments, some or all of the functionality for scoring images and/or determining a selected image may be performed by processor 202. In this regard, the example processes discussed herein can be performed by at least one processor 202 and/or image scoring module 270. For example, non-transitory computer readable storage media can be configured to store firmware, one or more application programs, and/or other software, which include instructions and other computer-readable program code portions that can be executed to control each processor (e.g., processor 202 and/or image scoring module 270) of the components of system 100 to implement various operations, including the examples described above. As such, a series of computer-readable program code portions are embodied in one or more computer program products and can be used, with a computing device, server, and/or other programmable apparatus, to produce machine-implemented processes.

User selection data generation module 274 may provide functionality in generating user selection data (e.g., active user selection data, passive user selection data, etc.) based on received user selection indications. In some embodiments, some or all of the functionality for generating user selection data may be performed by processor 202. In this regard, the example processes discussed herein can be performed by at least one processor 202 and/or user selection data generation module 274. For example, non-transitory computer readable storage media can be configured to store firmware, one or more application programs, and/or other software, which include instructions and other computer-readable program code portions that can be executed to control each processor (e.g., processor 202 and/or user selection generation module 274) of the components of system 100 to implement various operations, including the examples described above. As such, a series of computer-readable program code portions are embodied in one or more computer program products and can be used, with a computing device, server, and/or other programmable apparatus, to produce machine-implemented processes.

Redemption data generation module 278 may provide functionality in generating redemption data based on received redemption indications as described herein. In some embodiments, some or all of the functionality for generating redemption data may be performed by processor 202. In this regard, the example processes discussed herein can be performed by at least one processor 202 and/or redemption generation module 278. For example, non-transitory computer readable storage media can be configured to store firmware, one or more application programs, and/or other software, which include instructions and other computer-readable program code portions that can be executed to control each processor (e.g., processor 202 and/or redemption generation module 278) of the components of system 100 to implement various operations, including the examples described above. As such, a series of computer-readable program code portions are embodied in one or more computer program products and can be used, with a computing device, server, and/or other programmable apparatus, to produce machine-implemented processes.

FIGS. 3A and 3B show example embodiments of consumer devices 104 and 104'. The consumer devices 104 and 104' like the image selection device may have processing circuitry, including a processor 302 and memory 304, and a communications module 308. Additionally, the consumer devices 104 and 104' may be configured to support a user interface 306.

The user interface 306 may be in communication with processing circuitry to receive a user selection indication and/or to provide an audible, visual, mechanical or other output to the user. In one embodiment, the user interface may embody an input/output module of the type described in connection with FIG. 2A. As such, the user interface 306 may include, for example, a keyboard, a mouse, a joystick, a display, a touch screen display, a microphone, a speaker, a graphical user interface, other input/output mechanisms, and/or some combination thereof. As such, the user interface 306 may, in some example embodiments, provide means for a user to access and interact with an image selection device 102 in accordance with various example embodiments. Such access and interaction may include sending to the image selection device 102 user selection indications and receiving from an image selection device 102 a selected image for a promotion. Additionally, such access and interaction could include receiving all or part of a promotion, an impression, and/or instrument. Further, the communications module 308 may facilitate this access and interaction by sending messages to and receiving messages from the image selection device 102.

In some embodiments, as shown in FIG. 3B, a consumer device 104' may comprise a user selection data generation module 374 and/or a redemption data generation module 378. In this embodiment, user selection indications generated by the user interface 306 are converted into user selection data by the user selection data generation module 374 at the consumer device prior to being transmitted to the image selection device 102. Similarly, in this embodiment, redemption indications generated by the user interface 306 are converted into redemption data by the redemption data generation module 378 at the consumer device prior to being transmitted to the image selection device 102.

FIG. 4 shows an example embodiment of a merchant device 106. The merchant device 106 may have a communications module 408 and processing circuitry, including a processor 402 and memory 404. Additionally, the consumer device may be configured to support an input/output module 406.

The input/output module 406 may be in communication with processing circuitry to receive a redemption indication. As such, the input may include, for example, a keyboard, a mouse, a joystick, a display, a touch screen display, a microphone, a speaker, a graphical user interface, a barcode scanner, other input/output mechanisms, and/or combination thereof. The communications module 408 may facilitate sending a received redemption indication to the image selection device 102. Alternatively, in one optional embodiment, redemption indications generated by the user interface 306 of the merchant device 106 are converted into redemption data by the redemption data generation module 478 at the merchant device prior to being transmitted to the image selection device 102.

Referring to FIGS. 2A-4, the processing circuitry may include a processor (e.g., processor 202, processor 302 and processor 402) and a memory (e.g., memory 212, memory 304, and memory 404). The processing circuitry may be embodied as a circuit chip (e.g., an integrated circuit chip) configured (e.g., with hardware, software or a combination of hardware and software) to perform operations described herein. In other words, the image selection device 102 or the processing circuitry may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The processing circuitry may be configured to perform data processing, application execution and/or other processing and management services according to one or more example embodiments.

The processing circuitry (e.g., processor 202, processor 302 and processor 402) may be embodied in a number of different ways. For example, the processing circuitry may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like.

Although the processors of FIGS. 2A-4 are each illustrated as a single processor, it will be appreciated that each processor may comprise a plurality of processors. The plurality of processors may be in operative communication with each other and may be collectively configured to perform one or more functionalities of a networked device (e.g., an image selection device 102, consumer device 104, 104' and merchant device 106), as described herein. The plurality of processors may be embodied on a single computing device or distributed across a plurality of computing devices collectively configured to function as a networked device as described herein.

In some example embodiments, the processors may be configured to execute instructions stored in the memories or otherwise accessible to the processors. As such, whether configured by hardware or by a combination of hardware and software, the processors may represent an entity (e.g., physically embodied in circuitry—in the form of processing circuitry) capable of performing operations according to embodiments of the present invention while configured accordingly. Thus, for example, when a processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memories (e.g., memory 212, memory 304 and memory 404) may include one or more non-transitory memory devices such as, for example, volatile and/or non-volatile memory that may be either fixed or removable. In this regard, the memories may comprise a non-transitory computer-readable storage medium. It will be appreciated that while each memory is illustrated as a single memory, the memories may each comprise a plurality of memories. The plurality of memories may be embodied on a single computing device or may be distributed across a plurality of computing devices collectively configured to perform the function of the networked device as described herein.

The memories (e.g., memory 212, memory 304 and memory 404) may be configured to store information, data, applications, instructions and/or the like for enabling the networked devices (e.g., an image selection device 102, consumer device 104 and merchant device 106) to carry out various functions in accordance with one or more example embodiments. For example, the memories may be configured to buffer input data for processing by the processors. Additionally or alternatively, the memories may be configured to store instructions for execution by the processors. As yet another alternative, the memories may include one or more databases that may store a variety of files, contents or data sets.

Communications modules (e.g., communication module 208, communication module 308 and communication module 408), may include one or more interface mechanisms for enabling communication with other devices and/or networks. In some cases, the communications modules may be any means such as a device or circuitry embodied in either hardware, or a combination of hardware and software that is configured to receive and/or transmit data from/to a network and/or any other device or module in communication with the processing circuitry. By way of example, the communications module 208 may be configured to enable the image selection device 102 to communicate with a consumer device 104, merchant devices 106, and/or other computing device via the network 108. Accordingly, a communications module may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Among the contents of the memories (e.g., memory 212, memory 304, and memory 404) applications may be stored for execution by processors (e.g., processor 202, processor 302 and processor 402) in order to carry out the functionality associated with modules (e.g., image selection module 210, communications module 208, communications module 308, communications module 408). In some cases, the aforementioned memories may be in communication with one or more of the aforementioned processors and/or modules, via bus(es) for passing information among components of the network devices (e.g., image selection device 102, consumer device 104, and merchant device 106).

In some example embodiments, the processors (e.g., processor 202, processor 302 and processor 402) or processing circuitry may be embodied as, include, or otherwise control modules (e.g., image selection module 210, communications module 208, communications module 308, communications module 408). As such, the aforementioned modules may be embodied as various means, such as circuitry, hardware, a computer program product comprising computer readable program instructions stored on a computer readable medium (for example, the memory 212) and executed by a processing device (for example, aforementioned processors), or some combination thereof. The aforementioned modules may be capable of communication with one or more memories or other modules to access, receive, and/or send data as may be needed to perform one or more of the functionalities of network devices (e.g., image selection device 102, consumer device 104, and merchant device 106) as described herein.

Having described several embodiments of the system 100 as depicted in FIG. 1 and described several embodiments of the image selection device 102 as depicted in FIGS. 1-2, the image selection services that may be provided by the system 100 and image selection device 102 will now be described in accordance with several example embodiments.

Image Selection

Figure 5A:
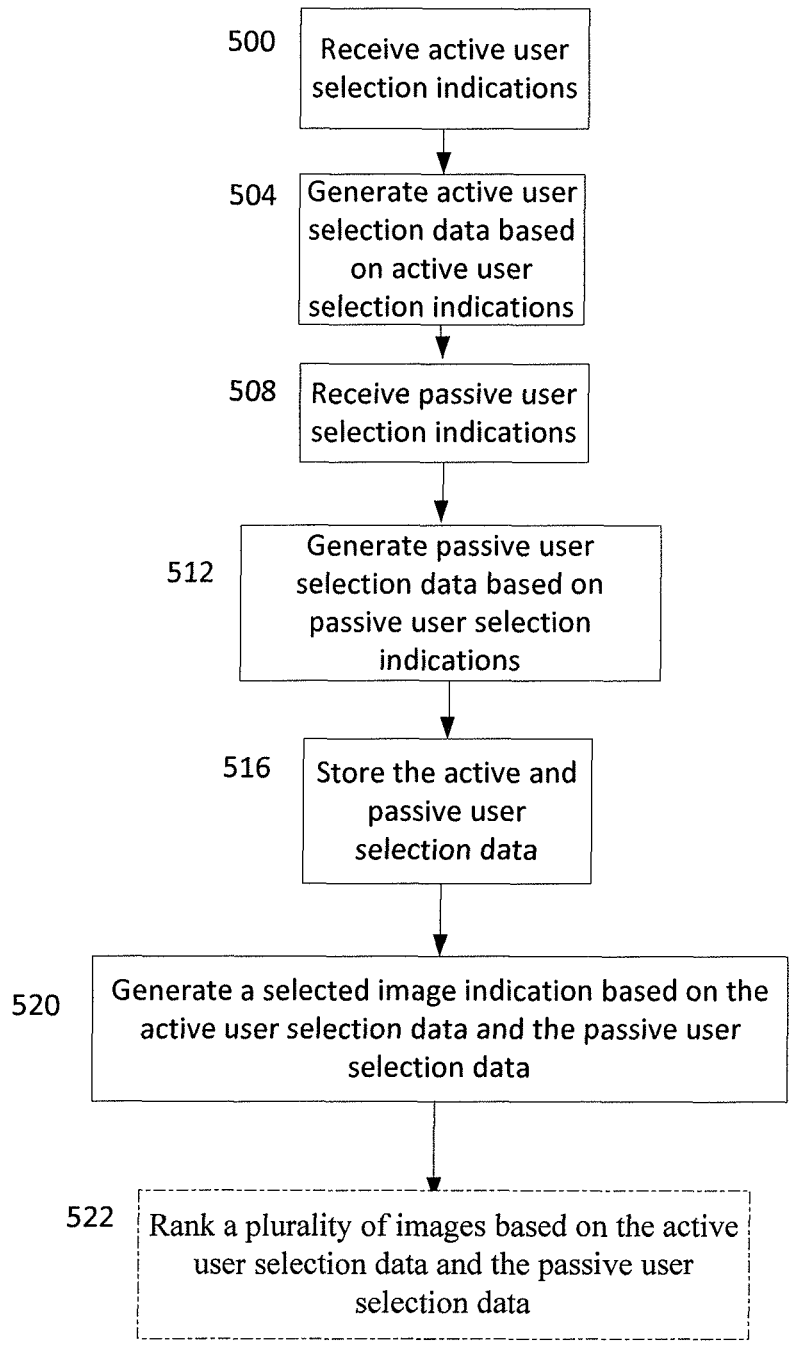

FIG. 5A is a flowchart showing an exemplary process for image selection for a user accessing an image selection device 102 in accordance with some example embodiments discussed herein. In some embodiments, an image selection device 102 may identify an image for presentation to a user, and it will be appreciated that operations and configurations of an image selection device are referred to as an example embodiment hereinafter. The illustrated process may be executed by one or more machines (some examples of which are discussed in further detail with respect to FIGS. 1-4 above) to provide the example displays illustrated by FIGS. 9-11 discussed below, among others, in accordance with some example embodiments discussed herein.

As shown by operation 500, the image selection device 102 may include means, such as a processor 202, communications module 208, or the like, configured to receive active user selection indications from a consumer device 104, using wired or wireless communications. In some embodiments, the active user selection indications may be a request to access the image selection device and/or view content. In some embodiments, the active user selection indications may include logon credentials, and/or profile information such as demographic information, preferences, location information, preferred social media information, likes, and dislikes. This information may be provided by the user, such as, for example, by answering questions presented by the image selection device 102. The active user selection indications may be provided upon accessing the image selection device 102, or may be retrieved from a user information database (which may or may not be part of the relevance database discussed above) upon providing logon credentials to the image selection device. In some embodiments, profile information may be stored locally to memory of the consumer device or to memory of the image selection device.

Additionally or alternatively, according to some embodiments, the image selection device 102 may prompt the user with any number of questions in order to use the location information to its advantage in displaying content and/or scoring images. For example, if a real time location conflicts with a known home location of a consumer, the image selection device may prompt the user to provide more information such as requesting that the user indicate whether the real time location is a new home location, a frequently visited travel destination, or a one-time visited location. Any information provided regarding a home location and real time location of a device may be associated with the user and stored locally to the consumer device or to memory of (or accessible by) the image selection device, and may be considered active user selection indications which may be used to generate active user selection data, as described below.

At operation 504, the image selection device 102 may include means, such as a processor 202, or the like, configured to generate active user selection data, with a user selection data generation module 274, based on the active user selection indications. In some embodiments, active user selection data may include a single value parameter, such as a location of Dallas. Additionally or alternatively, active user selection explicit data may include a list of values, such as a list of hobbies which may include basketball, reading, and travel for one user or consumer according to an example embodiment. In some embodiments, active user selection data may be a binary value, such as a gender parameter indicating that the gender of the user is male or female. Active user selection data may also be quantitative, for example, such as a user's age.

At operation 508, the image selection device 102 may include means, such as a processor 202, a communications module 208, or the like, configured to receive passive user selection indications, which may be retrieved from the consumer device 104/104'. The passive user selection indications may include signals associated with stored cookies (e.g., web browser created text files) on the consumer device 104/104', for example. Any such cookies may be associated with the image selection device 102 or any other system capable of storing cookies on the consumer devices 104/104'. The cookies may comprise information relating to user trends or interests that may allow image selection device 102 to identify an image from a set of images that may be of particular interest to the consumer or otherwise engage the consumer to better perceive an associated promotion. In some embodiments, the image selection device 102 may utilize browsing history to track which third party websites users have recently visited and/or which goods or services users may be purchasing. Additionally or alternatively, the image selection device 102 may determine a device type (e.g., iPhone®, Blackberry®, etc.) of a consumer device 104/104'.

In some embodiments, usage of the image selection device 102 by the user may be considered passive user selection indications. For example, the image selection device 102 may access data stored by the web browser of the consumer device 104/104' that is indicative of the amount of time a user spends viewing specific content, including without limitation, third party content and/or content of the image selection device (e.g., promotion content, etc.). The image selection device 102 may also track a number of clicks on a user interface of the consumer device 104/104', and/or particular pages or content channels viewed on a user interface 306 of the consumer device 104' may be considered passive user selection indications. Such information may be considered passive user selection indications, and may be used as discussed herein to further configure the image selection processes.

Additionally or alternatively, the image selection device 102 may receive passive user selection indications such as a detected current location of a consumer device 104/104'. Although a user location based on a home location may be accessed in profile information (e.g., a user's home state is California and home city is San Francisco), it may be advantageous for the image selection device to detect a dynamic, real time, location for the consumer device 104/104' (e.g., the consumer device is currently located in Los Angeles). This detection may be particularly advantageous, for example, when a user is not logged onto the image selection device 102, has not provided a home location, and/or a detected real time location conflicts with a known home location of the user.

The image selection device 102 may detect a real time location of a consumer device by any number of methods. A global positioning system (GPS) operative on the consumer device 104/104' may identify a real time location of the device, which may communicate the location to the image selection device 102. Similarly, a cell tower triangulation process may be used to identify a real time location of the consumer device 104/104', which may be transmitted to an image selection device. Additionally, a real time location of a consumer device may be detected by use of a Wi-Fi access point. Once a consumer device 104/104' detects a Wi-Fi access point, the consumer device and/or image selection device 102 may therefore identify the location of the consumer device.

Additionally or alternatively, an image selection device 102 may detect a real time location of consumer device 104/104' by accessing cookies stored on the device, and/or a device type of the consumer device used to access the image selection device 102. The detected real time location may be considered passive user selection indications, and may be used by the image selection device 102 in identifying an image from a set of images to associate with a promotion.

Another example of passive user selection indications may include data received from a third party system, such as from a host system of a social networking website, or other system capable of storing user information. A user may therefore provide preferences, activities, or other information to a third party system, and the image selection device 102 may receive the information as passive user selection indications.

As shown by operation 512, the image selection device 102 may include means, such as a processor 202, a user selection data generation module 274, or the like, configured to generate passive user selection data based on the passive user selection indications. Similar to active user selection data, passive user selection data may be a multi-value variable, or binary, for example. Passive user selection data may be a location of a device, or a device type, based on the passive user selection indications. In some embodiments, particularly those in which use of the image selection device 102 is captured as passive user selection indications, passive user selection data may be generated indicating the interest level of a user, and/or likelihood of the user being interested in a particular image or promotion. Additionally or alternatively, passive user selection data may include information regarding purchase history on third party sites.

In some embodiments, as shown by operation 516, the image selection device 102 may include means, such as a processor 202, a memory 212, or the like, configured to store the active and/or passive user selection data. The active user selection data and/or passive user selection data may be stored in memory 212, such as a user record as part of a relevance database 206, and associated with a user. As such, active and passive user selection data may be subsequently retrieved by the image selection device 102. The image selection device 102 may identify a user by user-provided logon credentials or an IP address, for example, and retrieve the active and passive user selection data from a user record.

At operation 520, the image selection device 102 may include means, such as a processor 202, an image selection module 210, or the like, configured to generate a selected image indication based on the active user selection indications and the passive user selection indications. In some embodiments, for example, the image selection device 102 may select one image from a plurality of images that are accessible from a memory 212, such as image database 204. The selected image may be identified based on the active user selection data and passive user selection data, with the goal of increasing user engagement in an associated promotion.

In one embodiment, which may be performed in addition to operation 520 or as an alternative to operation 520, at operation 522, the image selection device 102 may include means, such as a processor 202, an image selection module 210, or the like, configured to rank a plurality of images based on the active user selection indications and passive user selection indications. As such, whereas a first image may be determined to be most relevant, other images may be ranked according to relevancy, and based on the active user selection indications and the passive user selection indications. In some embodiments, the ranking may indicate that the first ranked image is the selected image for a given promotion.

As used in the foregoing specification and appended claims, the term "based on active user selection indications" refers to weighting, scoring, or ranking algorithms that are based directly or indirectly on active user selection indications. For example, algorithms that generate an image based on active user selection data are indirectly based on active user selection indications (which were used to create active user selection data) and, thus, fall within the meaning of the term "based on active user selection indications".

As used in the foregoing specification and appended claims, the term "based on passive user selection indications" refers to weighting, scoring, or ranking algorithms that are based directly or indirectly on passive user selection indications. For example, algorithms that generate an image based on passive user selection data are indirectly based on passive user selection indications (which were used to create passive user selection data) and, thus, fall within the meaning of the term "based on passive user selection indications".

As used in the foregoing specification and appended claims, the term "based on user selection indications" refers to weighting, scoring, or ranking algorithms that are based directly or indirectly on user selection indications. For example, algorithms that generate an image based on user selection data are indirectly based on user selection indications (which were used to create user selection data) and, thus, fall within the meaning of the term "based on user selection indications".

Figure 5B:
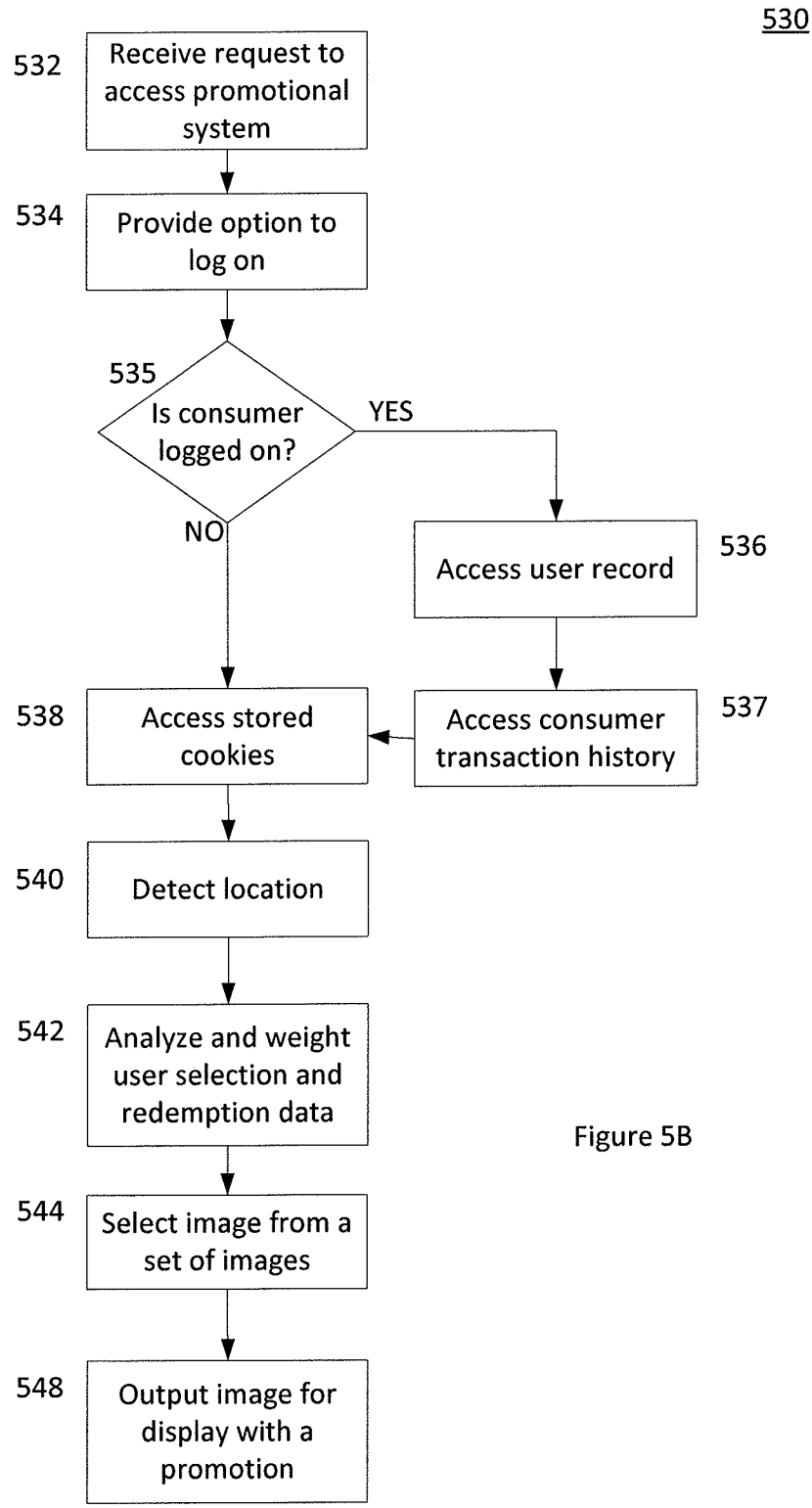

FIG. 5B illustrates an additional exemplary process for selecting an image that may be presented to a consumer upon such consumer accessing an image selection device, such as the promotional system of a promotion and marketing service. The illustrated process may be executed by one or more machines (e.g., consumer device 104/104') to provide the example displays illustrated by FIG. 10 discussed below, among others, in accordance with some example embodiments discussed herein.

At operation 532, image selection device (e.g., image selection device 102 of FIG. 1) may include means, such as a processor 202, a communications module 208, or the like, configured to receive a request to access the image selection device. Such a request may be initiated by a consumer using a consumer device (e.g., consumer device 104/104' of FIG. 1) to access a website hosted by the image selection device. In some embodiments, the image selection device 102 may transmit push notifications to a consumer device 104/104'. Upon being alerted of the communication, the consumer may opt to access the image selection device 102.

As shown by operation 534, in some embodiments, the image selection device 102 may include means, such as a processor 202, a communications module 208, or the like, configured to provide to the consumer an option to log on, providing credentials such as a username and password, for example. The credentials that are entered and transmitted to the image selection device 102, such as on the user interface of the consumer device 104/104' may be considered active user selection indications. In scenarios in which the image selection device 102 may access stored credentials in cache or cookies, for example, the system may recognize the consumer as already being logged on, and may not provide the option to log on.

Continuing to operation 536, in instances in which the consumer is logged on, the image selection device 102 may include means, such as a processor 202, a memory 212/304, communications module 208, or the like, configured to access a user record. The user record may be stored remotely to memory, such as memory 304 of the consumer device or locally to memory, such as memory 212 of the image selection device (such as a promotional database) or stored as part of a relevance database 206. User records may comprise any consumer provided demographic information, preferences, location information, and/or any other information gathered and stored by image selection device 102 and associated with a consumer. Said differently, the user record may comprise active user selection data and passive user selection data.

Further, at operation 537, the image selection device 102 may include means such as a processor 202, a memory 212, or the like, configured to access consumer transaction history. The consumer transaction history may be stored in memory 212 and/or a promotional database 207 and may comprise data relating to past purchases placed by the consumer including providers for which the consumer purchased promotions. The consumer transaction history may comprise indications of specific promotion types or channels from which the consumer often makes purchases or any other information relating to prior purchases made by the consumer, and may therefore be considered passive user selection data. The consumer transaction history may further comprise indications of specific promotion types or channels from which the consumer has redeemed prior purchases, and may therefore be considered redemption data.

As used in the foregoing specification and appended claims, the term "based on redemption indications" refers to weighting, scoring, or ranking algorithms that are based directly or indirectly on redemption indications. For example, algorithms that generate an image based on redemption data are indirectly based on redemption indications (which were used to create redemption data) and, thus, fall within the meaning of the term "based on redemption indications".

Continuing to operation 538, the image selection device 102 may include means, such as a processor 202, a communications module 208, or the like configured to access stored cookies (e.g., web browser created text files) on a consumer device 104/104'. Any such cookies may be associated with the image selection device 102, third party system, or any other system capable of storing cookies on a consumer device. The cookies may comprise information relating to consumer trends or interests that may allow the image selection device 102 to identify an image to present to a consumer in order to better engage the consumer with a particular promotion. In some embodiments, the image selection device 102 may utilize browsing history to track which third party websites consumers have recently visited and/or which goods or services consumers may be purchasing.

Additionally or alternatively, the image selection device 102 may include means such as a processor 202, a communications module 208, or the like configured to detect a current location of consumer device 104/104', as shown in operation 540. This detection may be particularly advantageous, for example, when a consumer is not logged onto the image selection device 102, has not provided a home location, and/or a detected real time location conflicts with a known home location of a consumer. The image selection device 102 may detect a real time location of consumer device 104/104' by any number of methods, such as those described above.

At operation 542, the image selection device 102 may include means, such as a processor 202, an image selection module 210, or the like, configured to analyze, and/or assign a weight (e.g., select and apply a scoring algorithm) to any or all user selection data and/or redemption data accessed in regard to operations 532-542 described above and/or any other information made accessible to the image selection device. As such, the image selection device 102 may produce analytics data to aid in selecting promotions, promotion types, and/or images that a consumer may be likely interested in. Greater weights may be applied to information more impactful in marketing appropriate promotions, while lower weights may be applied to information having less of an impact. In some embodiments, a set of ranked rules may be considered in the weighting of the user selection data. In some embodiments, the rules may override or outweigh other factors in ranking and/or scoring algorithms.

At operation 544, the image selection device 102 may include means, such as a processor 202, an image selection module 210, or the like, configured to select an image from a set of images to associate with a promotion, based on the outcome of the analysis and weighting of information as described with respect to operation 542.

At operation 548, the image selection device 102 may include means, such as a processor 202, an image selection module 210, or the like, configured to output an image for presenting with a promotion. As such, the image selection device 102 may return, to a consumer device 104/104', a response, such as an HTTP response, indicative of content (e.g., promotion content) and/or an image selection identifier to display or render. The response transmitted from the image selection device 102 to the consumer device 104/104' may be generated based on any of the user selection data and/or redemption data (and therefore, user selection indications and/or redemption data).

Figure 5C:
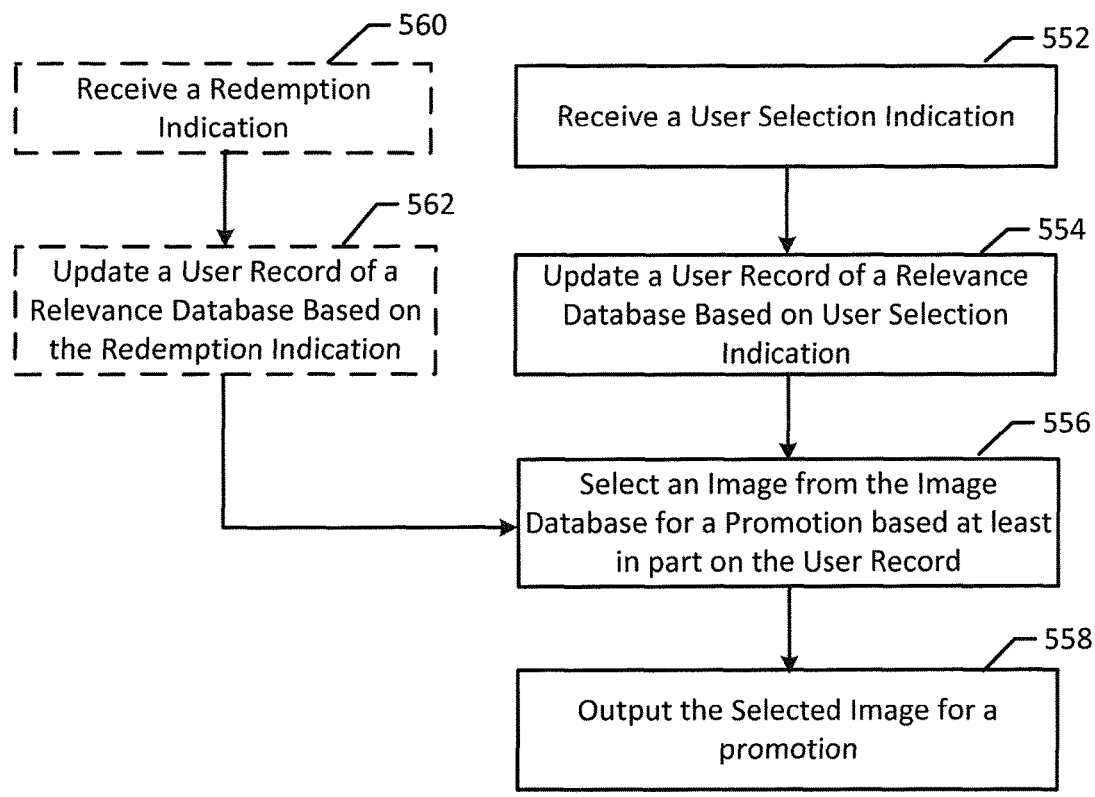

FIG. 5C is a flowchart depicting an example method for selecting and outputting an image in association with a promotion. For convenience, the operation 550 will be described with respect to a system, including one or more computing devices, that performs the operation 550. Specifically, the operation 550 will be described with respect to its implementation by the image selection device 102 in system 100.

At operation 552, the image selection device 102 may include means, such as a processor 202, a communications module 208, or the like, configured to receive a user selection indication at operation. The user selection indication may be entered on the consumer device 104/104', for example by entering the user selection indication on a user interface 308. The communications interface 206 may receive the user selection indication from the consumer device 104/104' through the communications module 208. In the depicted embodiment, the user selection indication may include an active user selection indication, a passive user selection indication, or a combination of both.

At operation 554, the image selection device 102 may include means, such as a processor 202, a memory 212, or the like, configured to update a user record based on a user selection indication. The processor 202 may cause the user record stored in a memory 212, such as the relevance database 206, to be updated for the received user selection indication.

At operation 556, the image selection device 102 may include means, such as a processor 202, image selection module 210, or the like, configured to select an image for a promotion based on the user record. The processor 202 may select an image from a memory 212, such as the image database 204 based at least in part on the user record.

At operation 558, the image selection device 102 may include means, such as a processor 202, a communications module 208, or the like, configured to output the selected image for a promotion. The processor 202 may cause the communications module 208 to transmit the selected image to the consumer device 104/104' for display on a user interface, such as user interface 306 in proximity or as a portion of a promotion.

In an example embodiment, the image selection device 102 may include means, such as a processor 202 a communications module 208, or the like, configured to receive redemption indication(s) at operation 560. The redemption indications may be received by the communications module 208, from the merchant device 106.

In a further example embodiment, the image selection device 102 may include means, such as a processor 202, a memory 212, or the like, configured to update a user record based on the redemption indication. The processor 202 may cause the user record, stored in a memory 212, such as the relevance database 206, to be updated based on the redemption indication. So therefore, an embodiment of an image selection device could receive both user selection indication(s) as well as receiving redemption indication(s). Additionally, an example method could include updating a user record of a relevance database based on redemption indication(s) 562 as well as based on user selection indication(s) 554.

While not shown in FIG. 5C, one of ordinary skill in the art will readily appreciate that the update user record step of operation 554 may include generating user selection data (e.g., active user selection data, passive user selection data, or both) based on the user selection indication. Such generating may be performed by a user selection data generation module (e.g., user selection data generation module 274, 374, or some combination thereof). Similarly, one of ordinary skill in the art will readily appreciate that the update user record step of operation 562 may include generating redemption data based on the received redemption indication. Such generating may be performed by a redemption data generation module (e.g., redemption generation module 278, 378, 478, or some combination thereof).

In an example embodiment, the image selection device may update a user record of a relevance database based only on the received redemption indication(s) and the selection an image from the image database for a promotion may be based at least in part on the user record that only contains redemption indications.

Other example embodiments, the image selection device 102 may only updating a relevance database 206 for part of received redemption indication(s) or user selection indication(s).

FIG. 5D illustrates operations of a consumer device 104/104' for displaying a selected image in connection with a promotion in accordance with various embodiments of the invention. The depicted operations may be performed using a consumer device 104/104' of system 100 as shown in FIG. 1.

At operation 572, the consumer device 104/104' may include means such as a processor 302, user interface 306, or the like, configured to receive a user input. The user input may include a username and/or a password which may be entered on an user interface 306. In some embodiments, the user input may be stored and retrieved from a local memory, such as memory 304 on the consumer device 104/104'.

In some embodiments, at operation 574, the consumer device 104/104' may include means such as a processor 302, memory 304, a user selection generation module 347, or the like, configured to generate at active or passive user selection data (e.g., via a user selection data generation module) from active or passive user selection indications. The active user selection data may be generated based on the user input, for example, a username and/or a password. In some embodiments, a user record, which may include active or passive user selection indications, as described, may be retrieved from memory 304 of the consumer device 102 (or from a promotional database 207 or a relevance database 206 associated with the image selection device 102 using a communications module 308). Passive user selection data may be generated locally on the device, such as with a user selection generation module 374, based on data retrieved from memory 304 and/or third party systems.

Continuing to operation 576, the consumer device 104/ 104' may include means such as a processor 302, a communications module 308, or the like, configured to transmit a request to an image selection device 102. The request may comprise any of the user input, active user selection indications/data, passive user selection indications/data, and/or redemption indications/data.

At operation 578, the consumer device 102 may include means, such as a processor 302, a communications module 308, or the like, configured to receive a selected image indication from the image selection device 102, in response to the request, for presentment proximate a promotion. The selected image indication may be in the form of an identifier used to identify an image to be displayed or rendered, or the consumer device 104/104' may receive a URL from the image selection device 102 identifying an image location.

At operation 580, the consumer device 104/104' may include means such as a processor 302, a user interface 306, or the like, configured to display or render the selected image. The processor 302 may cause the selected image to be displayed on a user interface 306 based on the selected image indication, in an impression proximate a promotion. As such, a consumer using the consumer device may view the selected image to better define the displayed promotion. The operations of FIGS. 5A to and 5D are provided as examples, and it will be appreciated that various configurations may be implemented, such that some operations are performed by the image selection device, and some operations are performed by the consumer device.

FIG. 6 is a flowchart showing an example method for selecting an image. The method may be performed by an image selection device 102 as described in FIG. 1. At operation 602, the image selection device 102 may include means, such as a processor 202, or the like, configured to determine whether a promotion is associated with an image set containing at least a first and second image as opposed to a single standard image.

In an instance in which the selected promotion is not associated with an image set, the image selection device 102 may include means such as a processor 202, a communications module 208, or the like, configured to output a standard image at operation 616.

In an instance in which an image set is associated with a promotion, the method may continue at operation 604. The image selection device 102 may include means such as a processor 202, a memory 212, image scoring module 270, or the like, configured to select a scoring algorithm for scoring or ranking the set of images. the selection of the scoring algorithm may be based on active user selection data, passive user selection data, redemption data, or some combination thereof. The processor 202 may retrieve the scoring algorithm form a memory, such as memory 212

At operation 606, the image selection device 102 may include means such as a processor, image selection module 270, or the like, configured to select an image by applying the scoring algorithm. In some example embodiments, the scoring algorithm is a predictive function that calculates a predicted relevance value associated with each image of the set of images using data representing attributes of the promotion and the consumer (e.g., proximity of the consumer's location to the promotion location, the promotion price category, a value representing the popularity of the promotion among past consumers, active user selection data, passive user selection data, and any combination thereof). The image selection device 102 may assign a predicted relevance value to respective images of the set of images. In an example embodiment, the set of images can be sorted and/or ranked based on their respective associated predicted relevance values.

At operations 610 and 611, the image selection device 102 may include means, such as a processor 202, or the like, configured to compare and select predicted relevance value or score of a first image to other predicted relevance values or scores for other images. For example, a predicted relevance value determined for an image A may be compared to predicted relevance values for images B and N at operation 610/611. In some example embodiments, in an instance in which the predicted relevance value for image A is highest, image A may be selected at operation 612. In an instance in which the predicted relevance value for image B is the highest, then image B may be selected at operation 613. In an instance in which, the predicted relevance value for image N is the highest, then image N may be selected at operation 615. As will be apparent to one of ordinary skill in the art, various other scoring or ranking methods may be used to select an image from a set of images in accordance with the inventive concepts herein described.

At operation 614, the image selection device 102 may include means such as a processor 202, an image selection module 270, or the like, configured to output the selected image, e.g. highest ranked image. The processor 202 may cause the communications module 308 to transmit instructions from the image selection device to a consumer device 104/104' to render the selected image proximate a specific promotion, on a user interface 306.

In an example embodiment, although not shown in FIG. 6, the set of images may comprise a set of image components. Example embodiments may determine whether an image set contains an image component based on metadata, image size, a unique image ID, or other image attributes. The scoring algorithm when selected and applied ranks the image components. In one embodiment, the highest scoring image components may be selected and merged to form "a selected image" as discussed in connection with FIG. 9.

FIG. 7 is a block diagram illustrating an example user record 700, image database 710, and promotions database 720 structured in accordance with various embodiments of the invention. As will be apparent to one of skill in the art in view of this disclosure, the data structures, fields, and information shown is provided for illustration purposes and is not intended to limit the scope of the inventive concepts herein described.

The depicted user record 700 comprises active user selection data 702, passive user selection data 704, and redemption data 706. The depicted user record 700 may be generated, stored, maintained, and modified as part of relevance database 206 of FIG. 2. The data stored to user record 700 may be created based on or otherwise embody various indications (e.g., electrical signals) received to the image selection device 102 or other system 100 component. For example, active user selection data 702 may be created based on or otherwise embody received active user selection indications. Passive user selection data 704 may be created based on or otherwise embody received passive user selection indications. Active user selection data 702 and passive user selection data 704 may be collectively refer erred to as "user selection data" and may be collectively created based on or otherwise embody "user selection indications." Redemption data 706 may be created based on or otherwise embody received redemption indications.

The depicted active user selection data 702 comprises profile preferences 710 and consumer characteristics 708, such as gender, address, age, marital status, pet-owner status, and the like. The profile preferences 710 may be entered by the consumer, via a user interface of the consumer device, in response to a survey, registration questionnaire, or other means. The consumer may indicate "preferences" that may relate to one or more types of promotions such as, without limitation, whether a consumer prefers travel promotions, restaurant promotions, spa promotions, etc. The consumer may further indicate "preferences" that may relate to promotion details such as, without limitation, as to restaurant promotions, whether the consumer prefers Italian cuisine, is a connoisseur of fine wine, prefers beer, is a vegetarian, or the like. As to spa promotions, the consumer could indicate whether they prefer massages to pedicures, and the like. As to travel promotions, they could indicate whether they prefer Caribbean travel promotions to European travel promotions, etc. The profile preferences may further comprise "home" location information that is entered by a consumer, i.e., the consumer's home town is Chicago, Ill.

In some example embodiments, consumers could provide or update active user selection data including profile preferences 710 and consumer preferences 708 through interacting with the user interface 306 of a consumer device 104/104' when initially registering or setting up an account to purchase promotions, before receiving a promotion, when redeeming a promotion, or otherwise when interacting with the image selection device, promotions database, or relevance database. It will be appreciated that the user interface 306 could receive active user selection indications in response to mandatory or optional consumer surveys, questionnaires, electronic check boxes, drop down menus, and the like.

The depicted passive user selection data 704 comprises, without limitation, detected location information (e.g., current location the consumer device 104/104' and/or historical location of the consumer device has traveled), clicking-through information concerning one or more promotions, promotion purchase history information, weather and/or season information concerning the consumer (e.g., the consumer is engaging the image selection device 102 or the promotions database 207 during winter, or the consumer most actively purchases promotions during summer, etc.), and hover information (e.g., the consumer tends to place the selection indicator or mouse pointer over certain promotions but not others).

The mobile location could indicate a detected location (e.g., via GPS, WiFi address, or other technique). Images or image components selected based on mobile location information may be images of the city or community or like city or like community indicative of that mobile location. Alternatively or additionally, images may include familiar or common images associated with that community such as drink types, physical facial features, and the like common to that community. The mobile location could indicate sub-geographic information associated with a demographic population. Images or image components selected based on a user record containing indications comprising sub-geographic information may be images of a specific block or street or a like block or street. A promotion showing familiar scenery, items or people may be more attractive to a consumer considering purchasing a promotion.

The depicted redemption data 706 comprises, without limitation, historical data indicating that certain promotions were redeemed (as opposed to simply clicked upon, hovered over, or purchased). The redemption data may further document which images were associated with the promotions redeemed by the consumer, which locations (e.g., cities, states, neighborhoods, merchant locations, etc.) where used to redeem past promotions, which merchants enjoyed past redemptions, and in which seasons (e.g., spring, summer, fall, and winter) the consumer redeemed such past promotions.

FIG. 7 also illustrates example images 711 and/or image components. Images may be paired or grouped in sets 712. Example embodiments may correlate one or more images to a promotion. For example, one set of spa promotion related images may include a first image of a woman enjoying a spa treatment while a second image depicts a man enjoying a spa treatment. In one embodiment, depending on the gender of consumer (and other user selection indications or data) the image selective device may select the first image or the second image to present to a consumer who was interested in viewing spa related promotions.

Another example image set 712 may include wine, water and beer image components or variations on a restaurant image with wine, water or beer at the table. In one embodiment, if user selection indications and/or redemption indications indicated a targeted consumer preferred wine, beer, or perhaps non-alcoholic beverages, the image selection device may select (based on the outcome of the scoring algorithm) the wine image, beer image, or water image to present to a consumer who was interested in viewing restaurant related promotions. Another example image set may include a first image of adults enjoying snorkeling and a second image of children enjoying snorkeling. In one embodiment, if user selection indications and/or redemption indications indicated that a targeted consumer was single or married without children, the image selection device may select the first image for presenting to the consumer in connection with travel promotions. Alternatively, if the user selection indications and/or redemption indications indicated that the targeted consumer had children, the image selection device may select the second image for presenting to the consumer in connection with travel promotions.

Additional images sets may include seasonal image sets 714. For example, a given promotion may have distinct images for summer, winter, fall (not shown), and spring (not shown). Using a restaurant promotion for illustration, and without limitation, a summer image may depict a couple enjoying a meal on a terrace of a restaurant on a sunny day, a winter image may depict a couple enjoying a meal by the warm hearth of well-tended fireplace, a spring image may depict a couple enjoying a meal on a terrace surrounded by a beautiful flower garden, and a fall image my depict a couple enjoying a meal on a terrace surrounded by trees in their peak fall colors. In one embodiment, if user selection indications and/or redemption indications indicated that a targeted consumer was requesting to view restaurant promotions in the month of March, the image selection device may select the spring image for presenting to the consumer.

In an example embodiment, the images sets 711 may include one or more image components 716. In some embodiments, once components are selected by the image selection device they may be merged or combined to form the "selected image" to be presented with a promotion. Merging could include layering component images, adding together component images, and the like. For example, one image component may include a restaurant image, which could be layered atop varying backgrounds including, without limitation, a countryside scene, a mountain scene, a valley scene, a sunset scene, a city scene, and the like.

Alternatively, should the consumer be interested in spa promotions, a spa image could be layered atop such background image components.

Alternatively or additionally, an image component may be an image of a man, woman, couple, or family that may be layered atop spa images, restaurant images, or images associated with any other promotion. A variety of additional image components may be apparent to one of ordinary skill in the art in view of the inventive concepts herein described.

FIG. 7 also shows example promotions 720. Such promotions may be stored to a promotions database and may include, without limitation, featured promotions, getaways promotions, goods promotions, and services promotions. As discussed above, promotions may include any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

FIG. 7 also shows example impressions 722 including a web page display, an e-mail, a text message, or flyer. In some example embodiments, a consumer device 104 is further configured to receive, generate, or render an impression. In some embodiments, the impression may include the image selected by the image selection device and a description or offer associated with a promotion. Such impressions may be accessible in some embodiments by the consumer upon registering an account with the promotion and marketing service and/or with a given merchant.

Scoring

FIG. 8 shows an example embodiment of the indications content stored in a user record 800 in a relevance database 206. This user record has user selection indications including the consumer's address, age and gender. She has either explicitly or implicitly (e.g., actively or passively) defined profile preferences including that she drinks wine and she like hair grooming promotions. The user record 800 also contains purchase history for this consumer including the type of the promotion, the locations of those promotions purchased, including zip code and type of community. The user record may also include a redemption history (i.e., redemption data) for one or more promotions so that the user record may be analyzed to determine not only which promotions were purchased but which were also redeemed. Embodiments of the type of community may be rural, urban or city; artistic, minimalist or traditional; some combination; or some other community characteristics.

The example user record 800 illustrated in FIG. 8 also stores common themes or image components associated with past purchase activity. For example, the user record comprises data documenting that two or more previously purchased promotions included images having sunsets.

The depicted user record 800 also includes the consumer's gifting activities, specifically that she has given as a gift a promotion for a haircut that was redeemed at a merchant located in a certain zip code and community. The user record 800 also has redemption history where she has redeemed either in whole or in part certain of these purchase promotions. The user record 800 also includes her click-through history in that she has looked through vacation promotions and hair care promotions and the date of those click-through activities. It will be appreciated that other example embodiments could have more or less user selection indications or redemption indications stored in a user record 800, and that these indications could indicate different preferences, consumer characteristics and redemption activities.

In various embodiments, an image database 204 and/or relevance database 206 may comprises a plurality of images. Each image is associated with one or more promotions (e.g., a data record associated with each image may comprise one or more promotion identifiers). Each image is also associated with one or more key words (e.g., wine, sunset, beer, steak, pedicure, etc.) or categories (e.g., Italian food, spa treatments, getaway promotions, etc.), which may be stored in the form of metadata associated with the image.

In one embodiment, a promotion is selected for presenting to a consumer thereby defining a number of images associated with the promotion. The number of images must be scored or ranked to determine which of the images is best presented to the consumer with the promotion. In one example, three images (image A, image B, and image C) are associated with nail salon promotion.

In one example scoring algorithm, the key words and categories of images A-C are compared to a user record for the targeted consumer. If key words and categories precisely match data (e.g., user selection data, redemption data, etc.) from a user record then such key words and categories may be respectively assigned a first value, e.g., a value of 1. If key words and categories generally match (e.g., match synonyms or closely related words to such keywords or categories) data from the user record then such key words and categories may be assigned a second value, e.g., a value of 0.75. If key words and categories do not precisely or generally match data from the user record then such key words and categories may be assigned a third value, e.g., a value of 0.10.

In one scoring algorithm embodiment, the values assigned to each key word and category for each image may be summed and compared to yield a predicted relevance score for each image. The predicted relevance scores are then compared and the highest score is selected for presentation with the promotion by the image selection device.

In another scoring algorithm embodiment, various weights may be applied to the values assigned to each key word and category prior to such values being summed. For example, precise or general matches between redemption data and key words or categories may be given a greater weight than precise or general matches between gender data and key words or categories. The various weights are multiplied by the corresponding assigned values and the resultant weighted values are then summed and compared to yield a predicted relevance score for each image. The predicted relevance scores are then compared and the highest score is selected for presentation with the promotion by the image selection device 102.

The image selection device 102 may analyze, and/or assign a weight to any or all of the user selection indications/data and/or the redemption indications/data described above and/or any other information made accessible to the image selection device. As such, the image selection device 102 may produce analytics data to aid in selecting promotions, promotion types, and/or images that a consumer may be likely interested in. Greater weights may be applied to information more impactful in marketing appropriate promotions, while lower weights may be applied to information having less of an impact. In some embodiments, a set of ranked rules may be considered in the weighting of the user selection indications/data and/or the redemption data. In some embodiments, the rules may override or outweigh other factors in image selection and/or ranking. For example, one rule may preclude using a mountain scene background for restaurant promotions associated with restaurants in rural Indiana as such scenes are not common to the landscape of Indiana.

In some embodiments, the weights assigned to one or more assigned values may differ based on the promotion. For example, it may be determined that location or gender has a lesser impact on one promotion than it does for others. Thus, weights associated with location match values and gender match values may be discounted accordingly.

Image Output

FIG. 9 shows is a flowchart illustrating an operation 900 for merging or combining of image components to output a merged or selected image. In this example embodiment, a background image component (e.g., mountain image component 902A and stream image component 902B) is selected, as for example, based on geographic or sub-geographic location indications. A second image component selected may be a merchant component (e.g., image component 904A and image component 904B). If for example, user selection indications and/or redemption indications indicate a consumer is interested in promotions for hotels, a hotel image component 904A depicting a hotel may be selected. Alternatively, if the user has indicated they are interested in promotions for restaurants, a restaurant image component 904B depicting a restaurant related image (e.g., a restaurant table as shown) may be selected.

In some embodiments, additional image components may be selected. For example, if the user selection indications or redemption indications suggest that the consumer is a cat owner, a cat image component 906A may be selected. Similarly, if the user selection indications or redemption indications suggest that the consumer is a dog owner, a dog image component 906B may be selected.

In various embodiments, once two or more image components are selected they may be merged to form selected images 908A or 908B. Various known techniques may be used to facilitate such merger including layering various images one atop the other or other techniques that will be apparent to one of skill in the art in view of this disclosure.

Additionally, example embodiments may include operation 910 for determining whether a selected image should be modified in some way. In one embodiment, such decision may be based on user selection indications, redemption indications, and/or an associated scoring algorithm. Various modifications are available including modifications to brightness, contrast, tone, color, gamma, hue, saturation, or resolution. In other embodiments, the selected image may be cropped, resized, skewed, or the like.

The depicted modification includes darkening the mountain scene 902A to depict the hotel at twilight. The merged image as modified is presented as image 912A. Merged image 912B was left unmodified and thus matches image 908A.

FIG. 10 depicts example impressions 1000, 1010 having images selected in accordance with embodiments of the invention. Each impression comprises images 1002, 1004, 1012, 1014 presented in association with (e.g., presented proximate to) respective promotions 1003, 1005, 1013, 1015 (e.g., descriptions of promotions), which in the present embodiment relate to a hair stylist merchant and a family dentistry merchant. For illustration purposes, impressions 1000 and 1010 contain identical promotions 1003, 1005, 1013, 1015 (and related descriptions). However, in accordance with various embodiments described herein, different images have been selected for presentation proximate such promotions.

In one example embodiment, image 1002 was selected by the image selection device for positioning proximate promotion 1003. In the depicted embodiment, because the image selection device employed a scoring algorithm that heavily weighted gender and seasonality, the image selection device selected image 1002, which depicts a male figure getting his hair cut from a studio having a window through which snow falling can be seen, for an impression that is intended to be sent to a male consumer in January. Alternatively, the same scoring algorithm may be used by the image selection device to select image 1012, which depicts a female figure getting her hair cut from a studio having a window through which sunshine can be seen, for promotion 1013 as part of an impression that is intended to be sent to a female consumer in August.

Similarly because the image selection device employed a scoring algorithm that heavily weighted gender, the image selection device selected image 1004, which depicts a male figure receiving dental treatment from a male dentist, for an impression that is intended to be sent to a male consumer. Alternatively, the same scoring algorithm may be used by the image selection device to select image 1014, which depicts a female figure getting dental treatment from a female dentist, for promotion 1015 as part of an impression that is intended to be sent to a female consumer.

In example embodiments, consumers may have indicated in a consumer survey that they like certain types of promotions, as for example well-groomed deals 1006. While this survey may be explicitly expressing a user selection for the type of promotion, this information may implicitly express user selection indications that, for example, the consumer may prefer well-groomed people in the images. Thus, such indications may be used in image selection in accordance with various embodiments herein described.

FIG. 11 illustrates another example user record 1100. User record 1100 indicates dog friendly purchases (e.g., purchased promotions for service and/or products, including veterinarian services, dog food and dog toys). Additionally, user record 1100 indicates dog friendly redemptions, including dog food and dog toy promotion redemptions. As a result, a selected image associated with a promotion may include a dog image (e.g., image 1106). Additionally or alternatively, the impression may include an image in the body of the impression (e.g., image 1104), to attract attention to one or more promotions associated with the image.

FIGS. 5A-D, and 6 each illustrate a process flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 212, memory 304, and/or memory 404) storing instructions executable by a processor in the computing device (for example, by processor 202, processor 302, and/or processor 402).

In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, an image selection device 102, a consumer device 104 and/or other apparatus) to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, an image selection device 102, a consumer device 104 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

It will thus be appreciated by those skilled in the art that example embodiments of the present invention provide a substantial, technical contribution to the prior art and, in particular, solve a technical problem, namely, how to select and output an image associated with a promotion in a way that provides a personalized image to a consumer. Moreover, example embodiments may provide further technical advantages, such as improved identification of a promotion to a consumer, improved informative value of an image to a consumer, and improved consumer attraction to a promotion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method for solving problems associated with attracting and holding attention of a specific user by employing a process of visual persuasion characterized by selection and presentation, in association with a promotion, of an image from a set of images that is best suited to engage the specific user, thereby resulting in a more efficient promotion selection process for the specific user, improved identification of the promotion, and improved user engagement, the method comprising:

associating the promotion with at least one set of images of a plurality of images, each image of the at least one set of images associated with metadata indicative of one of more keywords descriptive of the image;

receiving data indicative of at least one user selection indication;

updating a user record based on the reception of the at least one user selection indication;

selecting, using a processor, at least one image from the at least one set of images for presentation in association with the promotion based at least in part on the user record, wherein the user record comprises image properties of images associated with previously redeemed promotions, wherein the selection of the at least one image from the at least one set of images comprises:

determining a relevance score for each image from the at least one set of images by:

(i) based on the promotion, each promotion being different, identifying the user selection data and redemption data;

(ii) identifying, from the user record, each of one or more redemption data found to be associated with previously redeemed promotions;

(iii) based on the user record, identifying each of one or more user selection data found to be associated with the user;

(iv) for each image, each image associated with the metadata indicative of one of more keywords descriptive of the image, identifying a number of matching user selection data between the one or more keywords associated with the image and the user selection data of the user record;

identifying a number of matching redemption data between the one or more keywords associated with the image and the redemption data identified in the user record as associated with previously redeemed promotions;

identifying a weight associated with each matching user selection data and redemption data, wherein the identification of the weights of the user selection data and the redemption data is based on a set of ranked rules;

multiplying each weight by a respective match;

summing the multiplied weighted matches to achieve a resultant for each image; and comparing the summed resultant for each keyword of each image to each summed resultants of each remaining keyword to yield a predicted relevance score for each image;

subsequently comparing the predicted relevance scores of each image of the set of images to each other image in the set of images;

identifying that image having a highest value;

checking contents of the image having the highest value against predefined rules identifying particular contents requiring exclusion;

if the image having the highest value does comprise contents requiring exclusion, excluding the image and identifying an image having a next highest value;

iteratively performing the checking and exclusion steps;

in an instance in which the image having the highest value does not comprise contents requiring exclusion, selecting the image; and causing a transmission of the selected at least one image in association with the promotion.

2. The method of claim 1, wherein the at least one user selection indication comprises a promotion purchase indication, a click-through indication, a hover indication, an active selection indication, or a passive selection indication.

3. The method of claim 2, wherein the active selection indication comprises at least one of profile preference indications and consumer characteristics indications.

4. The method of claim 1 further comprising:
receiving at least one redemption indication; and
wherein updating the user record is further based on the at least one redemption indication.

5. The method of claim 1, wherein the image database comprises dynamic images.

6. The method of claim 1, wherein the user record comprises geographic information.

7. The method of claim 6, wherein the user record comprises sub-geographic information associated with a demographic population.

8. The method of claim 1, wherein causing the transmission of the selected at least one image further comprises causing the transmission of the selected at least one image as a portion of an impression or instrument.

9. The method of claim 1 further comprising:
receiving at least one redemption indication; and
wherein the updating of the user record includes updating the user record based on the at least one redemption indication, and
wherein the selecting at least one image further comprises:
assigning weighted values to the at least one user selection indication and the at least one redemption indication,
calculating a relevance score for respective images of the at least one set of images based on the weighted values, and
selecting the at least one image from the at least one set of images for association with the promotion based on the relevance score.

10. The method of claim 1, wherein respective images of the plurality of images comprise image properties, and wherein the method further comprises:
modifying at least one of the image properties of the selected at least one image based on the user record.

11. The method of claim 10, wherein the image properties comprise brightness, contrast, tone, color, gamma, hue, saturation, or resolution, and wherein the modifying at least one of the image properties comprises modifying at least one of brightness, contrast, tone, color, gamma, hue, saturation, or resolution.

12. The method of claim 1, wherein the at least one user selection indication comprises a promotion purchase indication, a click-through indication, a hover indication, an active selection indication, profile preference indications, or consumer characteristics indications;

wherein the method further comprises:
receiving at least one redemption indication; and
modifying at least one of the image properties of the selected at least one image based on of the user record, wherein the image properties comprise brightness, contrast, tone, color, gamma, hue, saturation, or resolution, and wherein the modifying at least one of the image properties comprises modifying at least one of brightness, contrast, tone, color, gamma, hue, saturation, or resolution;

wherein updating the user record is further based on the at least one redemption indication;

wherein the selecting at least one image further comprises:
assigning weighted values to the at least one user selection indication and the at least one redemption indication,
calculating a relevance score for respective images of the at least one set of images based on the weighted values, and
selecting the at least one image from the at least one set of images for association with the promotion based on the relevance score; and wherein causing the transmission of the selected at least one image further comprises causing the transmission of the selected at least one image as a portion of an instrument or impression.

13. An apparatus for solving problems associated with attracting and holding attention of a specific user by employing a process of visual persuasion characterized by selection and presentation, in association with a promotion, of an image from a set of images that is best suited to engage the specific user, thereby resulting in a more efficient promotion selection process for the specific user, improved identification of the promotion, and improved user engagement, the apparatus comprising at least one processor and at least one memory, the at least one memory storing computer code that, when executed by the processor, causes the apparatus to:

associate the promotion with at least one set of images of a plurality of images, each image of the at least one set of images associated with metadata indicative of one of more keywords descriptive of the image;

receive data indicative of at least one user selection indication;

update a user record based on the reception of the at least one user selection indication;

select at least one image of the set of images for presentation in association with the promotion based at least in part on the user record, wherein the user record comprises image properties of images associated with previously redeemed promotions, wherein the selection of the at least one image from the at least one set of images comprises:
determining a relevance score for each image from at least one the set of images by:
(i) based on the promotion, each promotion being different, identifying the user selection data and redemption data;
(ii) identifying, from the user record, each of one or more redemption data found to be associated with previously redeemed promotions;

(iii) based on the user record, identifying each of one or more user selection data found to be associated with the user;
(iv) for each image, each image associated with the metadata indicative of one of more keywords descriptive of the image,
identifying a number of matching user selection data between the one or more keywords associated with the image and the user selection data of the user record;
identifying a number of matching redemption data between the one or more keywords associated with the image and the redemption data identified in the user record as associated with previously redeemed promotions;
identifying a weight associated with each matching user selection data and redemption data, wherein the identification of the weights of the user selection data and the redemption data is based on a set of ranked rules;
multiplying each weight by a respective match;
summing the multiplied weighted matches to achieve a resultant for each image; and
comparing the summed resultant for each keyword of each image to each summed resultants of each remaining keyword to yield a predicted relevance score for each image;
subsequently compare the predicted relevance scores of each image of the set of images to each other image in the set of images;
identify that image having a highest value;
check contents of the image having the highest value against predefined rules identifying particular contents requiring exclusion;
if the image having the highest value does comprise contents requiring exclusion, exclude the image and identifying an image having a next highest value;
iteratively perform the checking and exclusion steps;
in an instance in which the image having the highest value does not comprise contents requiring exclusion, select the image; and
cause a transmission of the selected at least one image in association with the promotion.

14. The apparatus of claim 13, wherein the computer code, when executed by the processor, further causes the apparatus to:
receive at least one redemption indication, and
wherein updating the user record is further based on the at least one redemption indication.

15. The apparatus of claim 13, wherein causing the transmission of the selected at least one image further comprises causing the transmission of the selected at least one image as a portion of an impression or instrument.

16. The apparatus of claim 13, wherein the respective images of the plurality of images comprise image properties, and the computer code, when executed by the processor, further causes the apparatus to:
modify at least one of the image properties of the selected at least one image based on the user record.

17. The apparatus of claim 16, wherein the image properties comprise brightness, contrast, tone, color, gamma, hue, saturation, or resolution, and wherein the modifying at least one of the image properties comprises modifying at least one of brightness, contrast, tone, color, gamma, hue, saturation, or resolution.

18. A computer program product for solving problems associated with attracting and holding attention of a specific user by employing a process of visual persuasion characterized by selection and presentation, in association with a promotion, of an image from a set of images that is best suited to engage the specific user, thereby resulting in a more efficient promotion selection process for the specific user, improved identification of the promotion, and improved user engagement, the computer program product comprising at least one non-transitory computer-readable storage medium having computer-readable program code portions stored therein, the computer-readable program code portions comprising program code instructions configured to:
associate the promotion with at least one set of images of a plurality of images, each image of the at least one set of images associated with metadata indicative of one of more keywords descriptive of the image;
receive data indicative of at least one user selection indication;
update a user record based on the reception of at least one user selection indication;
select at least one image of the set of images for presentation in association with the promotion based at least in part on the user record,
wherein the user record comprises image properties of images associated with previously redeemed promotions,
wherein the selection of the at least one image from the at least one set of images comprises:
determining a relevance score for each image from the at least one set of images by:
(i) based on the promotion, each promotion being different, identifying the user selection data and redemption data;
(ii) identifying, from the user record, each of one or more redemption data found to be associated with previously redeemed promotions;
(iii) based on the user record, identifying each of one or more user selection data found to be associated with the user;
(iv) for each image, each image associated with the metadata indicative of one of more keywords descriptive of the image,
identifying a number of matching user selection data between the one or more keywords associated with the image and the user selection data of the user record;
identifying a number of matching redemption data between the one or more keywords associated with the image and the redemption data identified in the user record as associated with previously redeemed promotions;
identifying a weight associated with each matching user selection data and redemption data, wherein the identification of the weights of the user selection data and the redemption data is based on a set of ranked rules;
multiplying each weight by a respective match;
summing the multiplied weighted matches to achieve a resultant for each image; and
comparing the summed resultant for each keyword of each image to each summed resultants of each remaining keyword to yield a predicted relevance score for each image;
subsequently comparing the predicted relevance scores of each image of the set of images to each other image in the set of images;

identifying that image having a highest value;

checking contents of the image having the highest value against predefined rules identifying particular contents requiring exclusion;

if the image having the highest value does comprise contents requiring exclusion, excluding the image and identifying an image having a next highest value;

iteratively performing the checking and exclusion steps;

in an instance in which the image having the highest value does not comprise contents requiring exclusion, selecting the image; and causing a transmission of the selected at least one image in association with the promotion.

19. The computer program product of claim 18, the computer-readable program code instructions are configured to:

receive at least one redemption indication, and wherein updating the user record is further based on the at least one redemption indication.

20. The computer program product of claim 18, wherein causing the transmission of the selected at least one image further comprises causing the transmission of the selected at least one image as a portion of an impression or instrument.

21. The computer program product of claim 18, wherein the respective images of the plurality of images comprise image properties, and the computer-readable program code instructions are configured to:

modify at least one of the image properties of the selected at least one image based on the user record.

22. The computer program product of claim 21, wherein the image properties comprise brightness, contrast, tone, color, gamma, hue, saturation, or resolution, and wherein the modifying at least one of the image properties comprises modifying at least one of brightness, contrast, tone, color, gamma, hue, saturation, or resolution.

\* \* \* \* \*